(12) United States Patent
Kim et al.

(10) Patent No.: US 11,983,372 B2
(45) Date of Patent: May 14, 2024

(54) TOUCH DISPLAY DEVICE, TOUCH PANEL, TOUCH SENSING CIRCUIT, AND TOUCH SENSING METHOD

(71) Applicant: LG Display Co., Ltd., Seoul (KR)

(72) Inventors: CheolSe Kim, Seoul (KR); JuHan Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/745,765

(22) Filed: May 16, 2022

(65) Prior Publication Data

US 2022/0276745 A1    Sep. 1, 2022

Related U.S. Application Data

(62) Division of application No. 16/720,629, filed on Dec. 19, 2019, now Pat. No. 11,347,361.

(30) Foreign Application Priority Data

Dec. 28, 2018  (KR) .......................... 10-2018-0173153
Oct. 23, 2019  (KR) .......................... 10-2019-0132497

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 3/0448* (2019.05); *G06F 2203/04104* (2013.01)

(58) Field of Classification Search
None
See application file for complete search history.

(56) References Cited

U.S. PATENT DOCUMENTS

2010/0020006 A1    1/2010  Otani
2010/0258360 A1*  10/2010  Yilmaz ................. G06F 3/0443
                                                                   178/18.06
(Continued)

FOREIGN PATENT DOCUMENTS

CN    101634765 A    1/2010
CN    105955558 A    9/2016
(Continued)

OTHER PUBLICATIONS

2nd Office Action dated Aug. 26, 2023 for counterpart Chinese Patent Application No. 201911325920.X with English translation.
(Continued)

*Primary Examiner* — Christopher R Lamb
(74) *Attorney, Agent, or Firm* — Morgan, Lewis & Bockius LLP

(57) ABSTRACT

The present disclosure relates to a touch display device, a touch panel, a touch sensing circuit and a touch sensing method. In the touch display device, the touch panel, and the touch sensing circuit, and in the method of performing touch sensing therein, a structure in which a plurality of touch sensor groups is arranged is provided, and one of a self-capacitance touch sensing scheme and a mutual-capacitance touch sensing scheme is adaptively implemented according to the type and position of a touch event. Therefore, the number of signal lines and the number of touch channels may be reduced, and the ghost phenomenon can be reduced or be overcome when multiple touches occur.

20 Claims, 26 Drawing Sheets

(56) References Cited

U.S. PATENT DOCUMENTS

| | | |
|---|---|---|
| 2011/0175835 A1 | 7/2011 | Wang |
| 2012/0154324 A1 | 6/2012 | Wright et al. |
| 2013/0265282 A1 | 10/2013 | Nakagawa et al. |
| 2013/0342770 A1 | 12/2013 | Kim et al. |
| 2014/0327649 A1 | 11/2014 | Lee et al. |
| 2015/0077370 A1 | 3/2015 | Kim et al. |
| 2016/0132152 A1 | 5/2016 | Tanaka |
| 2016/0162059 A1 | 6/2016 | Teng et al. |
| 2016/0196001 A1 | 7/2016 | Ku et al. |
| 2016/0349889 A1 | 12/2016 | Yang et al. |
| 2016/0349890 A1* | 12/2016 | Weng .................... G06F 3/0412 |
| 2017/0045985 A1* | 2/2017 | Lv ......................... G06F 3/0412 |
| 2017/0060328 A1 | 3/2017 | Kim et al. |
| 2018/0143717 A1 | 5/2018 | An et al. |
| 2018/0150177 A1 | 5/2018 | Hwang et al. |
| 2018/0348931 A1 | 12/2018 | Kim et al. |

FOREIGN PATENT DOCUMENTS

| | | |
|---|---|---|
| CN | 108089741 A | 5/2018 |
| EP | 3043245 A1 | 7/2016 |
| KR | 10-2018-0048294 A | 5/2018 |

OTHER PUBLICATIONS

Extended European Search Report issued in European Patent Application No. 19217456.3 dated May 13, 2020.

* cited by examiner

TOUCH DISPLAY DEVICE, TOUCH PANEL, TOUCH SENSING CIRCUIT, AND TOUCH SENSING METHOD

This application is a divisional of U.S. patent application Ser. No. 16/720,629, filed Dec. 19, 2019, which claims the priority benefit of Korean Patent Application No. 10-2018-0173153, filed on Dec. 28, 2018 and Korean Patent Application No. 10-2019-0132497, filed on Oct. 23, 2019 in the Korean Intellectual Property Office, all of which are hereby incorporated by reference.

BACKGROUND

Technical Field

The present disclosure relates to touch display devices, touch panels, touch sensing circuits, and touch sensing methods.

Discussion of the Related Art

A touch display device can provide a touch-based input function that allows a user to easily input data or commands intuitively and conveniently, in addition to displaying videos or images.

In order to provide a touch-based input function, such as user interfaces, by such a touch-based display device, it is necessary to detect the presence or absence of a user's touch on a display panel and detect correctly touch coordinates corresponding to the position of the touch on the display panel. To this end, the touch display device includes the touch panel with a touch sensor capable of sensing a touch.

The touch panel is normally configured with the touch sensor including a plurality of touch electrodes, a plurality of touch routing lines for connecting the touch electrodes to a touch sensing circuit, and the like. Meanwhile, the touch panel can include a plurality of touch pads (e.g., a plurality of touch channels) electrically connected with the touch sensing circuit.

Such a typical touch panel including the touch sensor with a complicate configuration or a multi-layered sensing stack may cause related manufacturing process to be complicated, production yield to be poor, or manufacturing cost to increase.

Further, as the size of the touch panel increases, the number of touch electrodes increases, and the number of signal lines and the number of touch channels also increase. Therefore, such an increase in the number of components results in the complexity and cost of touch panel manufacturing increasing, and the complexity and manufacturing cost of circuit components increasing.

In addition, when a multi-touch input is detected in the typical touch panel, reliability has been reduced because a ghost phenomenon occurs in which a point that is not actually touched is misinterpreted as a touch position.

SUMMARY

Accordingly, embodiments of the present disclosure are directed to touch display devices, touch panels, touch sensing circuits, and touch sensing methods that substantially obviate one or more problems due to limitations and disadvantages of the prior art.

It is at least one object of the present disclosure to provide a touch display device, a touch panel, a touch sensing circuit, and a touch sensing method, for enabling the number of signal lines and the number of touch channels to be reduced and the ghost phenomenon when multiple touches are inputted to reduce or be overcome.

It is at least one object of the present disclosure to provide a new type of touch panel capable of reducing the number of signal lines and the number of touch channels and reducing or overcoming the ghost phenomenon when multiple touches are inputted, and a touch display device, a touch sensing circuit, and a touch sensing method, for sensing a touch using the new type of touch panel.

It is at least one object of the present disclosure to provide a new type of touch panel including a plurality of touch sensor groups, and a touch display device, a touch sensing circuit, and a touch sensing method, for sensing a touch using the new type of touch panel.

It is at least one object of the present disclosure to provide a touch display device, a touch sensing circuit, and a touch sensing method, for enabling one of a self-capacitance touch sensing scheme and a mutual-capacitance touch sensing scheme adaptively to be implemented according to the type and position of a touch event.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display device is provided that includes: a touch panel including a plurality of touch sensor groups, each of touch sensor groups including a plurality of electrodes and a plurality of signal lines, and a touch driving circuit for sensing the touch panel.

Each of the plurality of touch sensor groups may include a first electrode row to a K-th electrode row. K is a natural number greater than or equal to 4.

In each of the plurality of touch sensor groups, i) two or more first electrodes may be arranged in each of odd-numbered electrode rows of the first to K-th electrode rows, and one second electrode may be arranged in each of even-numbered electrode rows of the first to K-th electrode rows, wherein the one second electrode arranged in each of the even-numbered electrode rows may be connected to a signal line different from one another, and two or more first electrodes arranged in an identical column among the two or more first electrodes arranged in each of the odd-numbered electrode rows may be connected to an identical signal line, or ii) two or more first electrodes may be arranged in each of the even-numbered electrode rows of the first to K-th electrode rows, and one second electrode may be arranged in each of the odd-numbered electrode rows of the first to K-th electrode rows, wherein the one second electrode arranged in each of the odd-numbered electrode rows may be connected to a signal line different from one another, and two or more first electrodes arranged in an identical column among the two or more first electrodes arranged in each of the even-numbered electrode rows may be connected to an identical signal line.

The plurality of touch sensor groups includes a first touch sensor group and a second touch sensor group. A plurality of signal lines electrically connecting a plurality of electrodes in included in the first touch sensor group to the touch driving circuit may overlap with at least an area of the second touch sensor group and be insulated from a plurality of electrodes included in the second touch sensor group in the touch panel.

In an area of each of the plurality of touch sensor groups, a size of each of the first electrodes may be smaller than a size of the second electrode.

The size of the second electrode may correspond to (K/2) times the size of each of the first electrodes.

In an area of each of the plurality of touch sensor groups, the number of first electrodes arranged in each electrode row may be identical to the number of the electrode rows in which the second electrodes are arranged.

In an area of each of the plurality of touch sensor groups, a length of the second electrode in a row direction may be greater than a length of the second electrode in a column direction.

The signal line connected to the second electrode may be arranged in the column direction, and the signal lines connecting between the first electrodes arranged in an identical column may be arranged in the column direction.

The K is odd, and in an area of each of the plurality of touch sensor groups, the two or more first electrodes arranged in each of the first electrode row and the K-th electrode row may have a smaller size than the two or more first electrodes arranged in each of remaining odd-numbered electrode rows.

The one second electrode arranged in each electrode row may form one horizontal touch electrode by being electrically connected to the touch driving circuit through one signal line, and all first touch electrodes arranged in an identical column among the two or more first electrodes arranged in each electrode row may form one vertical touch electrode by being electrically connected together by one signal line.

Each of the plurality of touch sensor groups may include (K/2) vertical touch electrodes and (K/2) horizontal touch electrodes, which intersect each other.

Signal lines connected to the horizontal touch electrodes included in each of the plurality of touch sensor groups may be arranged to be adjacent to each other.

One or more signal lines connected to vertical touch electrodes included in the first touch sensor group may be arranged between signal lines connected to horizontal touch electrodes included in the first touch sensor group of the plurality of touch sensor groups and signal lines connected to horizontal touch electrodes included in the second touch sensor group of the plurality of touch sensor groups.

The signal lines connected to the vertical touch electrodes included in the first touch sensor group may be arranged to be alternated with the signal lines connected to either horizontal touch electrodes included in the first touch sensor group of the plurality of touch sensor groups or horizontal touch electrodes included in the second touch sensor group of the plurality of touch sensor groups.

In an area of each of the plurality of touch sensor groups, the first electrodes may be driving electrodes and the second electrodes may be sensing electrodes. Alternatively, in an area of each of the plurality of touch sensor groups, the second electrodes may be driving electrodes and the first electrodes may be sensing electrodes.

When at least two touches of multiple touches occur in an area of one of the plurality of touch sensor groups, the touch driving circuit may be configured to drive, as a driving electrode, one or more of a plurality of electrodes included in the one touch sensor group in which the at least two touches of the multiple touches have occurred, and to sense, as a sensing electrode, remaining electrodes except for the one or more of the plurality of electrodes included in the one touch sensor group.

When multiple touches distributedly occur in areas of at least two of the plurality of touch sensor groups, the touch driving circuit may be configured to drive the plurality of electrodes included in the at least two touch sensor groups in which the multiple touches distributedly have occurred, and to sense sequentially the plurality of electrodes included in the at least two touch sensor groups one by one, or two or more at a time.

When a single touch occurs in an area of one of the plurality of touch sensor groups, the touch driving circuit is configured to drive a plurality of electrodes included in the one touch sensor group, and to sense sequentially the plurality of electrodes included in the one touch sensor group one by one, or two or more at a time.

The touch driving circuit may further include a touch controller outputting touch sensing data on each of the plurality of touch sensor groups by sensing the touch panel, and determining the presence or absence of a touch or a coordinate of the location of the touch (i.e., a touch coordinate) based on the touch sensing data on each of the plurality of touch sensor groups.

When at least two touches occur in an area of one first touch sensor group of the plurality of touch sensor groups, the touch controller may obtain a plurality of estimated touch points in the plurality of touch sensor groups based on the touch sensing data on each of the plurality of touch sensor groups, and determine touch coordinates on two or more touches by using sensing values on two or more estimated touch points selected from the plurality of estimated touch points based on touch sensing data on each of touch sensor groups adjacent to the first touch sensor group in which all of the plurality of estimated touch points are located.

In accordance with another aspect of the present disclosure, a touch sensing circuit is provided that includes: a controller determining (or selecting), as a sensing scheme, one of a first sensing scheme and a second sensing scheme according to locations of multiple touches when multiple touches occur in a touch panel including a plurality of touch sensor groups, and a sensor for sensing the touch panel according to the determined (or selected) sensing scheme.

The controller may determine the first sensing scheme as the sensing scheme when the multiple touches distributedly occur in areas of at least two touch sensor groups of the plurality of touch sensor groups, and determine the second sensing scheme as the sensing scheme when all of the multiple touches occur in an area of one of the plurality of touch sensor groups.

The first sensing scheme may be a sensing scheme for sensing a self-capacitance in electrodes arranged in two or more touch sensor groups, and the second sensing scheme may be a sensing scheme for sensing a mutual-capacitance between electrodes arranged in one touch sensor group.

In accordance with further another aspect of the present disclosure, provided is a touch sensing method of a touch display device that includes a touch panel including a plurality of electrodes and a plurality of signal lines, and a touch driving circuit for driving the touch panel.

The touch sensing method including: when a single touch occurs in an area of one of a plurality of touch sensor groups included in touch panel, applying one or more touch driving signals to all or one or more of a plurality of electrodes included in the one touch sensor group in which the single touch has occurred, and receiving one or more touch sensing signals from the all or one or more of the plurality of electrodes to which the one or more touch driving signals are applied, and when multiple touches occur in an area of one of the plurality of touch sensor groups, applying one or more touch driving signals to one or more of the plurality of electrodes included in the one touch sensor group in which the multiple touches have occurred, and receiving one or more touch sensing signals from one or more electrodes to which the one or more touch driving signals are not applied.

In accordance with yet another aspect of the present disclosure, a touch sensing circuit is provided that includes a touch driving circuit sensing a touch panel including a plurality of touch sensor groups and outputting touch sensing data on each of the plurality of touch sensor groups, and a touch controller determining the presence or absence of a touch or a coordinate of the location of the touch (i.e., a touch coordinate) based on the touch sensing data on each of the plurality of touch sensor groups.

When at least two touches occur in an area of one first touch sensor group of the plurality of touch sensor groups, the touch controller may obtain a plurality of estimated touch points in the plurality of touch sensor groups based on the touch sensing data on each of the plurality of touch sensor groups, and determine touch coordinates on two or more touches by using sensing values on two or more estimated touch points selected from the plurality of estimated touch points based on touch sensing data on each of touch sensor groups adjacent to the first touch sensor group in which all of the plurality of estimated touch points are located.

In accordance with yet another aspect of the present disclosure, a touch display device is provided that includes: a touch panel including a plurality of touch sensor groups and a plurality of signal lines, the plurality of touch sensor groups including a plurality of vertical electrodes and a plurality of horizontal electrodes, and a touch driving circuit sensing the plurality of vertical electrodes and the plurality of horizontal electrodes.

The plurality of vertical electrodes may include a first vertical electrode and a second vertical electrode. The plurality of horizontal electrodes may include a first horizontal electrode and a second horizontal electrode.

The plurality of signal lines may include a first signal line, a second signal line, and a third signal line.

The first signal line may be electrically connected to the first vertical electrode and the second vertical electrode; the second signal line may be electrically connected to the first horizontal electrode; and the third signal line may be electrically connected to the second horizontal electrode.

The first signal line may overlap with the first vertical electrode, the second vertical electrode, the first horizontal electrode, and the second horizontal electrode; the second signal line may overlap with the first horizontal electrode and the second horizontal electrode; and the third signal line may overlap with the second horizontal electrode.

The first signal line may not overlap with the second signal line and the third signal line within all or at least an area of an active area of the touch display device. The second signal line may not overlap with the third signal line within all or at least an area of the active area of the touch display device.

A size of the first horizontal electrode may be greater than that of the first vertical electrode. A size of the second horizontal electrode may be greater than that of the second vertical electrode.

The first signal line may be electrically connected to the first vertical electrode through at least one first contact hole, and the first signal line may be electrically connected to the second vertical electrode through at least one second contact hole.

The touch panel may include a plurality of data lines and a plurality of gate lines. At least one of the plurality of gate lines may overlap with the first signal line, the second signal line, and the third signal line.

A distance between the first vertical electrode and the touch driving circuit may be greater than that between the first horizontal electrode and the touch driving circuit. A distance between the first horizontal electrode and the touch driving circuit may be greater than that between the second vertical electrode and the touch driving circuit. A distance between the second vertical electrode and the touch driving circuit may be greater than that between the second horizontal electrode and the touch driving circuit.

In accordance with embodiments of the present disclosure, it is possible to provide a touch display device, a touch panel, a touch sensing circuit, and a touch sensing method, for enabling the number of signal lines and the number of touch channels to be reduced, and the ghost phenomenon to reduce or be overcome when multiple touches occur.

In accordance with embodiments of the present disclosure, it is possible to provide a new type of touch panel for enabling the number of signal lines and the number of touch channels to be reduced, and the ghost phenomenon to reduce or be overcome when multiple touches occur, and a touch display device, a touch sensing circuit, and a touch sensing method, for sensing a touch using the new type of touch panel.

In accordance with embodiments of the present disclosure, it is possible to provide a new type of touch panel including a plurality of touch sensor groups, and a touch display device, a touch sensing circuit, and a touch sensing method, for sensing a touch using the new type of touch panel.

In accordance with embodiments of the present disclosure, it is possible to provide a touch display device, a touch sensing circuit, and a touch sensing method, for adaptively implementing one of a self-capacitance touch sensing scheme and a mutual-capacitance touch sensing scheme according to the type and position of a touch event.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIGS. 8A, 8B and 8C are diagrams illustrating a hybrid-type touch panel including the plurality of touch sensor groups according to embodiments of the present disclosure.

FIGS. 10, 11A, 11B and 12 are other diagrams illustrating the hybrid-type touch panel including the plurality of touch sensor groups according to embodiments of the present disclosure.

DETAILED DESCRIPTION

Figure 1:
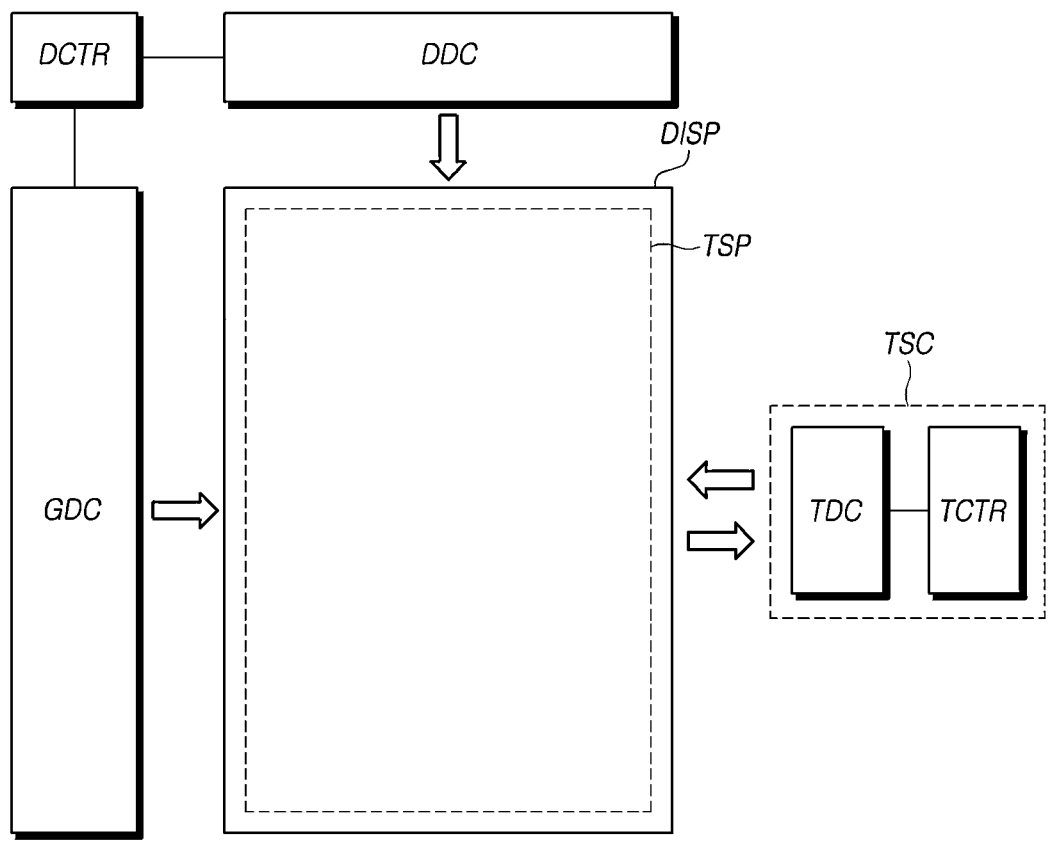
FIG. 1 is a block diagram schematically illustrating a system configuration of a touch display device according to embodiments of the present disclosure.

Advantages and features of the present disclosure and methods of achieving the same will be apparent by referring to aspects of the present disclosure as described below in detail in conjunction with the accompanying drawings. However, the present disclosure is not limited to the aspects set forth below, but may be implemented in various different forms. The following aspects are provided only to completely disclose the present disclosure and inform those skilled in the art of the scope of the present disclosure, and the present disclosure is defined only by the scope of the appended claims.

In addition, the shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description of the present disclosure, detailed description of well-known functions and configurations incorporated herein will be omitted when it is determined that the description may make the subject matter in some embodiments of the present disclosure rather unclear. The terms such as "including", "having", "containing", "comprising of", and "consist of" used herein are generally intended to allow other components to be added unless the terms are used with the term "only". As used herein, singular forms are intended to include plural forms unless the context clearly indicates otherwise.

In interpreting any elements or features of the embodiments of the present disclosure, it should be considered that any dimensions and relative sizes of layers, areas and regions include a tolerance or error range even when a specific description is not conducted.

Terms, such as first, second, A, B, (A), or (B) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element. Spatially relative terms, such as, "on", "over", "above", "below", "under", "beneath", "lower", "upper", "near", "close", "adjacent", and the like, may be used herein to describe one element or feature's relationship to another element(s) or feature(s) as illustrated in the figures, and it should be interpreted that one or more elements may be further "interposed" between the elements unless the terms such as "directly", "only" are used.

Any elements or features of the embodiments of the present disclosure are not limited to a specific meaning of the terms described above. The terms as used herein are merely for the purpose of describing examples and are not intended to limit the present disclosure. Although the terms "first", "second", and the like are used for describing various elements, or features, these elements are not confined by these terms. These terms are merely used for distinguishing one element from other elements. Therefore, a first element to be mentioned below may be a second element in a technical concept of the present disclosure.

The elements or features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, exemplary embodiments of the present disclosure will be described in detail with reference to the accompanying drawings.

FIG. 1 is a block diagram schematically illustrating a system configuration of a touch display device according to embodiments of the present disclosure.

Referring to FIG. 1, the touch display device herein can provide both the function of image display and the function of touch sensing.

To provide an image display function, the touch display device herein can include a display panel DISP including a plurality of data lines and a plurality of gate lines, and a plurality of subpixels defined by the plurality of data lines and the plurality of gate lines, a data driving circuit DDC driving the plurality of data lines, a gate driving circuit GDC driving the plurality of gate lines, and a display controller DCTR controlling the operation of the data driving circuit DDC and the gate driving circuit GDC.

Each of the data driving circuit DDC, the gate driving circuit GDC and the display controller DCTR may be implemented as one or more separate components. In some embodiments, at least two of the data driving circuit DDC, the gate driving circuit GDC and the display controller DCTR may be integrated into one component. For example, the data driving circuit DDC and the display controller DCTR may be implemented into a single integrated circuit chip (IC Chip).

To provide a touch sensing function, the touch display device can include a touch panel TSP including a plurality of touch electrodes, and a touch sensing circuit supplying a touch driving signal to the touch panel TSP, detecting a touch sensing signal from the touch panel TSP, and sensing the presence or absence of a user's touch on touch panel TSP or a touch location (a touch coordinate) based on the detected touch sensing signal.

The touch sensing circuit TSC can include a touch driving circuit TDC supplying a touch driving signal to the touch panel TSP and detecting a touch sensing signal from the touch panel TSP, a touch controller TCTR sensing the presence or absence of a user's touch on touch panel TSP or a touch location (a touch coordinate) based on the touch sensing signal detected by the touch driving circuit TDC, and the like.

The touch driving circuit TDC can include a first circuit part supplying a touch driving signal to the touch panel TSP and a second circuit part detecting a touch sensing signal from the touch panel TSP. The first circuit part and the second circuit part may be integrated into one circuitry, or separated from each other.

The touch driving circuit TDC and the touch controller TCTR may be implemented as separate components, one single component, or one component by integrating the touch driving circuit TDC and the touch controller TCTR.

Each of the data driving circuit DDC, the gate driving circuit GDC and the touch driving circuit TDC may be implemented as one or more integrated circuits, or implemented in a chip on glass (COG) type, a chip on film (COF) type, a tape carrier package (TCP) type, or the like, for electrical connection with the display panel DISP. The gate driving circuit GDC may be further implemented in a gate in panel (GIP) type.

Each of circuit components (the DDC, the GDC, or the DCTR) for display driving may be implemented as one or more separate components, and each of circuit components (the TDC, or the TCTR) for touch driving and sensing may be implemented as one or more separate components. Each of the circuit components (the DDC, the GDC, or the DCTR) for display driving and the circuit components (the TDC, or the TCTR) for touch driving and sensing may be implemented as one or more separate components. In some embodiments, one or more of the circuit components (the DDC, the GDC, or the DCTR) for display driving and one or more of the circuit components (the TDC, or the TCTR) for touch driving and sensing may be implemented as one or more components by being integrated into one or more functions. For example, the data driving circuit DDC and the touch driving circuit TDC may be implemented as one or more integrated circuit chips. When the data driving circuit DDC and the touch driving circuit TDC are implemented into two or more integrated circuit chips, each of the two or more integrated circuit chips may have a data driving function and/or a touch driving function.

The touch display device in accordance with embodiments of the present disclosure may be various types, such as a liquid crystal display (LCD) device, an organic light emitting diode (OLED) display device, or the like. Hereinafter, for convenience of description and ease of understanding, it is assumed that the touch display device is the liquid crystal display (LCD) device. That is, the display panel DISP may be an OLED panel, a LCD panel, or the like; hereinafter, for convenience of description and ease of understanding, discussions are conducted on the LCD panel as the display panel DISP for performing embodiments of the present disclosure.

As described below, the touch panel TSP can include a plurality of touch electrodes to which a touch driving signal is applied or from which a touch sensing signal is detected, a plurality of signal lines for connecting the touch electrodes to the touch driving circuit TDC, or the like.

The touch panel TSP may be placed outside of the display panel DISP. That is, the touch panel TSP and the display panel DISP may be fabricated separately and then coupled to each other. Such a touch panel TSP may be referred to as an external type or an add-on type.

Alternatively, the touch panel TSP may be embedded inside of the display panel DISP. That is, when the display panel DISP is fabricated, touch sensor elements of touch electrodes, signal lines, and the like constituting the touch panel TSP may be formed in conjunction with electrodes and signal lines for display driving. Such a touch panel may be referred to as an integrated type or an internal type. Hereinafter, for convenience of description, discussions are conducted on the integrated type of touch panel TSP.

The size of each touch electrode herein may correspond to the size of the area of one subpixel, or to the area of two or more subpixels.

Each touch electrode may be a plate type of touch electrode without an opening, or a mesh type of touch electrode with an opening.

When a touch electrode is the mesh type of touch electrode, and has an area that corresponds to the area of two or more subpixels, such as approximately equals to the area of two or more subpixels, the touch electrode may have two or more openings, and the location and size of each of the two or more openings may correspond to the location and size of a light emitting area of a subpixel.

Touch electrodes and electrodes served as touch electrodes herein may be electrodes for touch sensing, or be further served as common electrodes to which a common voltage is applied. In particular, when the touch panel TSP is integrated into the display panel DISP, the touch electrodes can perform the functionality of a touch sensor and the functionality of a common electrode together.

Meanwhile, the touch display device herein may be a liquid crystal display (LCD), an organic light emitting diode (OLED) display, a quantum dot display, or the like; however embodiments of the present disclosure are not limited thereto. It should be noted that in an instance where configurations, structures or features related to touches, or touch sensing methods, discussed below, may be applicable, any type of displays may be considered within the scope of the present disclosure.

For example, when the touch display device in accordance with embodiments of the present disclosure is a liquid crystal display, touch electrodes may be arranged on a display panel DISP included in the liquid crystal display and be common electrodes to which a common voltage for display driving is applied.

As another example, when the touch display device in accordance with embodiments of the present disclosure is an OLED display, the OLED display may have a top emission structure in which light is emitted toward the top of a display panel DISP, or a bottom emission structure in which light is emitted toward the bottom of the display panel DISP. When the touch display device in accordance with embodiments of the present disclosure is the OLED display, touch electrodes may be included in a display panel DISP and be arranged over the top of an encapsulation layer located over OLEDs and transistors. The location of such touch electrodes may be more suitable for the top emission structure. The touch electrodes may include a mesh pattern with openings for emission efficiency. The touch electrodes may be a transparent electrode or further include the transparent electrode. When the touch display device in accordance with embodiments of the present disclosure is the OLED display, the touch electrodes may be anode electrodes of OLEDs included in a display panel DISP, or be electrodes located on various layers located under the anode electrodes. The location of such touch electrodes may be more suitable for the bottom emission structure. The touch electrodes may include a mesh pattern with openings for emission efficiency. The touch electrodes may be a transparent electrode or further include the transparent electrode.

The touch electrodes included in the touch display device in accordance with embodiments of the present disclosure may be dedicated electrodes for touch sensing, or be electrodes for both display driving and the touch sensing.

Figure 2:
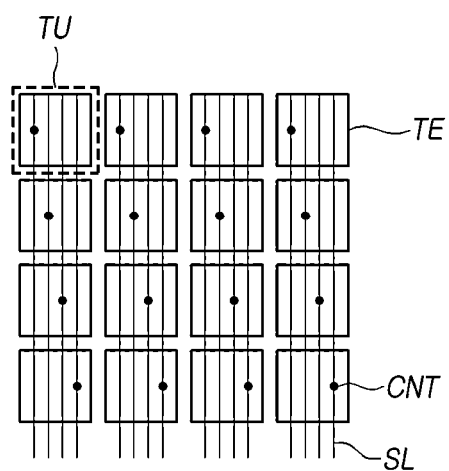
FIG. 2 is a diagram illustrating a split-type touch panel of the touch display device.

FIG. 2 is a diagram illustrating a split-type touch panel of the touch display device.

Referring to FIG. 2, the touch panel TSP of touch display device may be a split-type touch panel in which each of a plurality of touch electrodes TE is split from one another.

As in FIG. 2, in the case of the split-type touch panel TSP, each of the plurality of touch electrodes TE can be connected to another by a signal line SL through one or more contact holes CNT.

The plurality of touch electrodes TE can be located within an active area of the touch panel TSP. One or more of the plurality of touch electrodes TE, such as one or more outermost touch electrodes, may be located in a periphery (an outer edge) of the active area, or extend up to the periphery (the outer edge) of the active area. Here, the active area may be an area in which images can be displayed or touch sensing is available.

As shown in FIG. 2, a plurality of signal lines SL electrically connected to the plurality of touch electrodes TE can be located within the active area. As shown in FIG. 2, one signal line SL of the plurality of signal lines SL may be electrically connected to one touch electrodes TE of the plurality of touch electrodes TE through one contact holes CNT, and another signal line SL of the plurality of signal lines SL may be electrically connected to another touch electrodes TE of the plurality of touch electrodes TE through another contact holes CNT, and so on and so forth. All or part of the plurality of signal lines SL can be located in the periphery of the active area.

As shown in FIG. 2, when the plurality of signal lines SL electrically connected to the plurality of touch electrodes TE is located within the active area, the plurality of signal lines SL can be located on a different layer from the plurality of touch electrodes, and one or more of the plurality of signal lines can overlap one or more of the plurality of touch electrodes.

As shown in FIG. 2, all of the plurality of signal lines SL can be arranged from one or more points at which the touch sensing circuit TSC is connected with an identical length or similar lengths up to one or more opposite points. Each of the plurality of signal lines SL may be different from one another in a location electrically connected to a corresponded touch electrode TE, that is, the location of the contact hole.

Alternatively, each of the plurality of signal lines SL may extend from a point at which the touch sensing circuit TSC is connected to a point at which a corresponding contact hole CNT is located.

Hereinafter, referring to FIG. 2, in the split-type touch panel TSP, each of the plurality of touch electrodes TE may be referred to as a touch unit.

Referring to FIG. 2, in the split-type touch panel TSP, when one touch electrode TE is connected to one signal line SL, the number of the plurality of signal lines SL is needed to be identical to the number of the plurality of touch electrodes TE. Here, the number of the plurality of signal lines SL corresponds to the number of touch channels for a signal input or output of the touch driving circuit TDC.

As depicted in FIG. 2, in the touch panel TSP, 16 touch electrodes are arranged in four rows and four columns. In the touch panel TSP of FIG. 2, 16 signal lines SL and 16 touch channels can be arranged. That is, the number of touch electrodes in the split-type touch panel TSP may be determined by the product of the number of touch electrodes in arranged in one touch electrode row and the number of touch electrodes arranged in one touch electrode column.

That is, in the split-type touch panel TSP, the number of touch channels and the number of signal lines are determined by the product of the number of touch electrodes arranged in one touch electrode row and the number of touch electrodes arranged in one touch electrode column.

Accordingly, in the split-type touch panel TSP, as the number of touch electrodes increases, the number of touch channels and the number of signal lines increase.

When the touch panel TSP is larger or the number of touch electrodes increases in order to improve the accuracy of touch sensing, there is a problem that the number of touch channels and the number of signal lines increase too much. This may result in the fabrication of the panel being complicated and difficult, and the touch driving circuit TDC being complicated and expensive.

Meanwhile, the split-type touch panel TSP shown in FIG. 2, may be a touch sensor for sensing a touch based on a self-capacitance of each touch electrode TE, or a touch sensor for sensing a touch based on a mutual-capacitance between touch electrodes TE.

Figure 3:
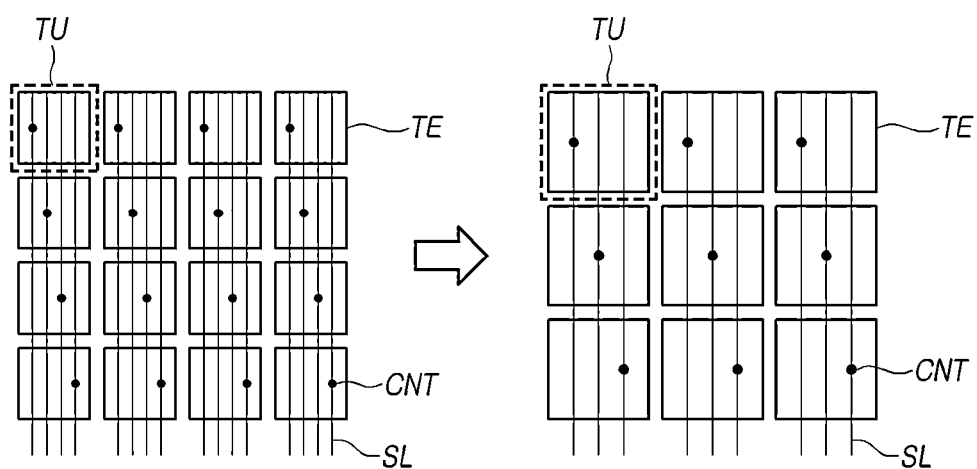
FIG. 3 is a diagram illustrating that the size of a touch electrode in the split-type touch panel is expanded, in order to reduce the number of signal lines and the number of touch channels, in the touch display device.

FIG. 3 is a diagram illustrating that the size of a touch electrode in the split-type touch panel TSP is expanded, in order to reduce the number of signal lines and the number of touch channels, in the touch display device.

In the touch display device, in order to reduce the number of signal lines and the number of touch channels, the size of a touch electrode in the split-type touch panel TSP can be expanded, as shown in FIG. 3.

As shown in FIG. 3, for a given area of the touch panel TSP, the number of touch electrodes (the number of touch units) is reduced from 16 (=4*4) to 9 (=3*3), and either the number of signal lines or the number of touch units are reduced from 16 (=4*4) to 9 (=3*3).

As described above, as the size of a touch electrode increases, the number of touch electrodes, the number of signal lines and the number of touch channels can be reduced, while the performance of touch sensing may be poor.

For example, in the case of a large-sized touch electrode, even when a user actually performs a touch on a point on a touch screen, there is a possibility that two more touch locations can be sensed. Such a phenomenon may be referred to as finger separation or touch separation.

Figure 4:
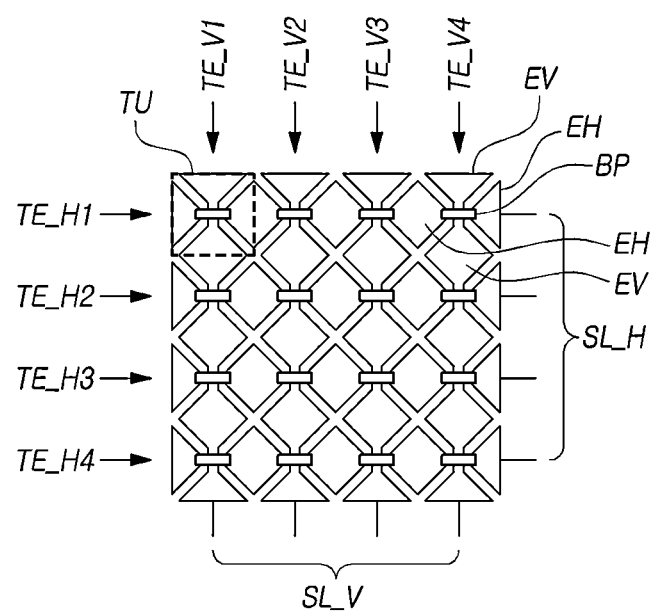
FIG. 4 is a diagram illustrating a matrix-type touch panel of the touch display device.

FIG. 4 is a diagram illustrating a matrix-type touch panel TSP of the touch display device.

Referring to FIG. 4, when the touch panel TSP of the touch display device is a matrix-type touch panel, a plurality of touch electrodes (TE_H1~TE_H4) arranged in a row direction and a plurality of touch electrodes (TE_V1~TE_V4) arranged in a column direction can be arranged to intersect one another in the touch panel TSP.

Each of the plurality of touch electrodes (TE_H1~TE_H4) arranged in the row direction may be a single electrode.

Each of the plurality of touch electrodes (TE_H1~TE_H4) arranged in the row direction may include several separate electrodes EH which are electrically connected to one another, as shown in FIG. 4. The several separate electrodes EH included in each of the plurality of touch electrodes (TE_H1~TE_H4) arranged in the row direction can be connected to one another using a bridge BP.

The several separate electrodes EH included in each of the plurality of touch electrodes (TE_H1~TE_H4) arranged in the row direction are electrically connected to one another by the bridge BP; therefore, have the same electric potential. The bridge BP and the several separate electrodes EH can be located on different layers, and electrically connected through a contact hole.

Each of the plurality of touch electrodes (TE_V1~TE_V4) arranged in the column direction may include several separate electrodes which are electrically connected to one another.

Alternatively, as shown in FIG. 4, each of the plurality of touch electrodes (TE_V1~TE_V4) arranged in the column direction may be a single electrode EV.

It should be noted that the shape, arrangement and configuration of the touch electrodes (TE_H1~TE_H4, TE_V1~TE_V4) illustrated in FIG. 4 are merely one example of implementing the matrix-type touch panel TSP As shown in FIG. 4, a signal line SL H can be connected to each of four touch electrodes (TE_H1~TE_H4) arranged in the row direction. A signal line SL V can be connected to each of four touch electrodes (TE_V1~TE_V4) arranged in the column direction.

In the case of the matrix-type touch electrode TSP illustrated in FIG. 4, the number of signal lines is identical to a sum of the number of touch electrodes (TE_H1~TE_H4) arranged in the row direction and the number of touch electrodes (TE_V1~TE_V4) arranged in the column direction.

The matrix-type touch electrode TSP illustrated in FIG. 4 is shown to have an identical size to the split-type touch electrode TSP illustrated in FIG. 2. Accordingly, the number of touch units in the touch panel TSP of FIG. 4 is 16 (=4*4) identical to that of FIG. 2.

However, in the case of the matrix-type touch electrode TSP shown in FIG. 4, the number of signal lines is a total of 8 (=4+4) and therefore smaller than the number of signal lines in the split-type touch panel TSP as shown in FIG. 2, that is, 16 (=4*4).

Likewise, in the case of the matrix-type touch electrode TSP shown in FIG. 4, the number of touch channels is a total of 8 (=4+4) and therefore smaller than the number of touch channels in the split-type touch panel TSP as shown in FIG. 2, that is, 16 (=4*4).

Accordingly, the number of signal lines and the number of touch channels can be reduced by arranging the plurality of touch electrodes (TE_H1~TE_H4, TE_V1~TE_V4) included in the touch panel TSP in the matrix-type as in FIG. 4, that is, by implementing the touch panel TSP in the matrix-type.

Meanwhile, the matrix-type touch panel TSP as in FIG. 4 may be a touch sensor for sensing a touch based on a self-capacitance of each of the touch electrodes (TE_H1 TE_H4, TE_V1~TE_V4) which intersect one another, or a touch sensor for sensing a touch based on a mutual-capacitance between the touch electrodes (TE_H1~TE_H4) arranged in the row direction and the touch electrodes (TE_V1~TE_V4) arranged in the column direction.

Figure 5:
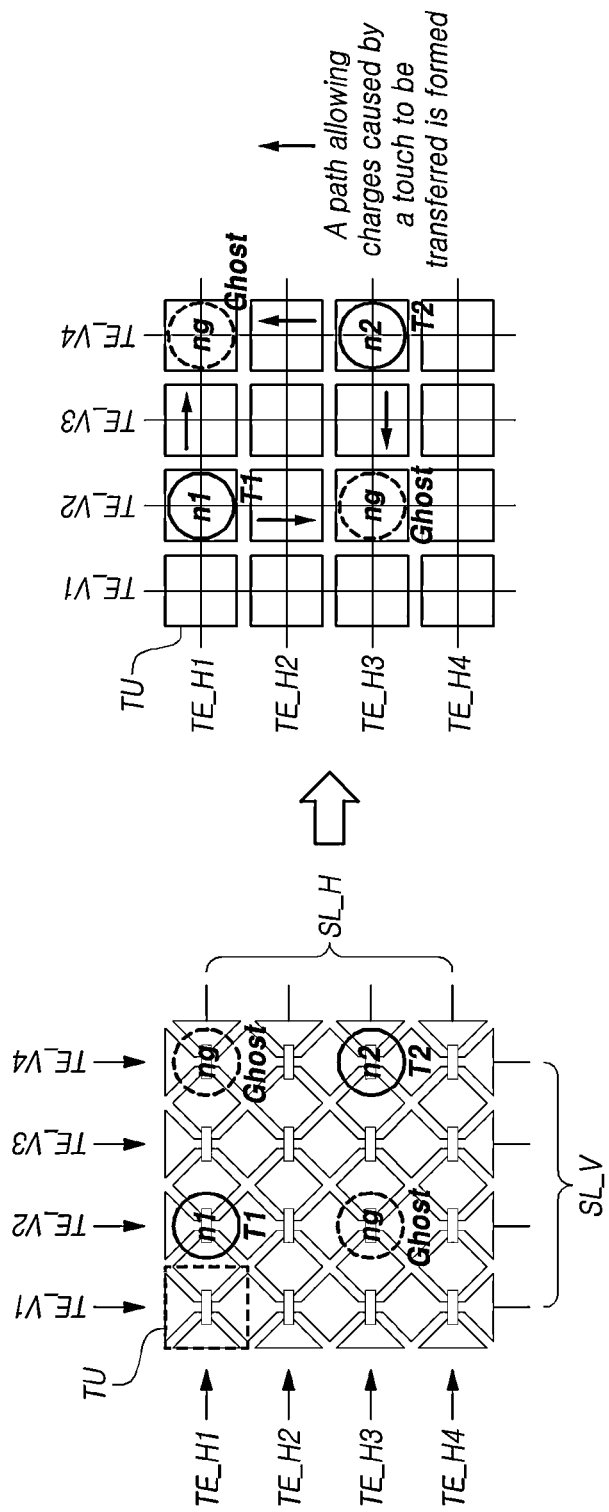
FIG. 5 is a diagram illustrating the ghost phenomenon caused when multiple touches are inputted in the matrix-type touch panel of the touch display device.

FIG. 5 is a diagram illustrating a ghost phenomenon occurred when multiple touches are performed in the matrix-type touch panel TSP of the touch display device.

Referring to FIG. 5, when the matrix-type touch panel TSP of touch display device is used, the touch electrodes (TE_H1~TE_H4) arranged in the row direction and the touch electrodes (TE_V1~TE_V4) arranged in the column direction are arranged to intersect one another.

Thus, when a user performs touches simultaneously or nearly simultaneously at two or more points n1 and n2, the touch sensing circuit TSC may detect, in addition to the points n1 the n2 touched by the user in actual, any one or more points ng by not touched by the user as if the user actually has touched.

That is, in the case of the matrix-type touch panel TSP, when multiple touches are performed at two or more points n1 and n2, the touch sensing circuit TSC may mistake both the actual touch points n1 and n2 and the pseudo touch points ng to a touched position.

Like this, the phenomenon that a pseudo touch point ng is recognized as an actual touch point may be referred to as a ghost phenomenon.

The pseudo touch points ng at which such a ghost phenomenon occurs can be points at which the actual touch points resulted from the multiple touches T1 and T2 intersect in different directions, such as the row direction and the column direction.

Such a ghost phenomenon may occur because touch electrodes (TE_H1, TE_H3, TE_V2, and TE_V4 as in FIG. 5) intersecting one another are served as a path through which charges caused by the multiple touches in the actual touched points n1 and n2 are transferred. In FIG. 5, arrows indicate the transfer of charges causing the ghost phenomenon.

Meanwhile, in the case of the matrix-type touch panel TSP, the number of signal lines and the number of touch channels may be reduced, but there is a disadvantage that the ghost phenomenon occurs when multiple touches are performed.

Figure 6:
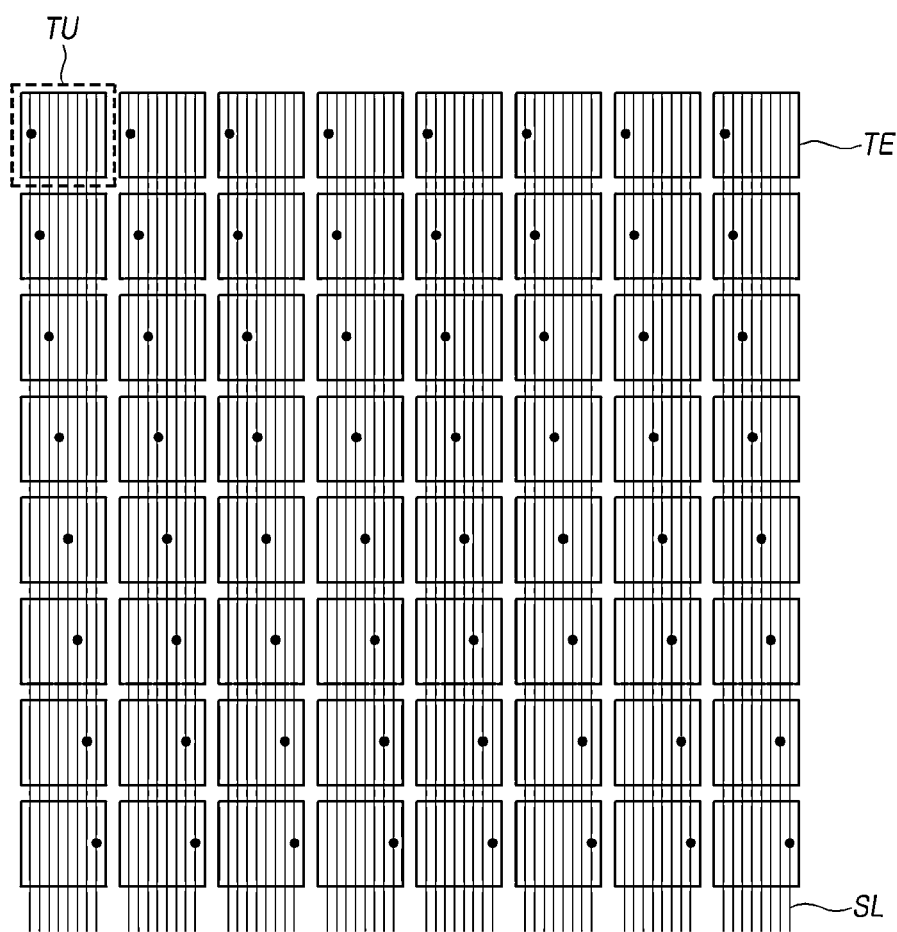
FIG. 6 is a diagram illustrating that 64 touch electrodes are arranged in the split-type touch panel.

FIG. 6 is a diagram illustrating that 64 touch electrodes TE are arranged in the split-type touch panel TSP.

Referring to FIG. 6, the split-type touch panel TSP can include 64 touch electrodes TE which are arranged in 8 rows and 8 columns.

In this configuration, in order to connect 64 touch electrodes TE to the touch driving circuit TDC, at least 64 signal lines SL are needed to be arranged in the touch panel TSP.

Accordingly, the touch driving circuit TDC is needed to have at least 64 touch channels.

As discussed above, in the case of the split-type touch panel TSP, since the number of touch electrode increases, thus, there is a disadvantage that the number of signal lines and the number of touch channels increase. Such a disadvantage may be overcome by increasing the size of touch electrode, but there is a disadvantage that touch sensing performance becomes poor due to the occurrence of a finger separation phenomenon, or the like.

Thus, in accordance with embodiments of the present disclosure, a touch panel TSP with an electrode arrangement structure and an electrode connection structure is provided for enabling the number of signal lines and the number of touch channels to be reduced, and the ghost phenomenon not to occur even when multiple touches are performed.

Such a touch panel TSP may be referred to as a hybrid type. The hybrid type means a type resulted from a mixture of the split type suitable for self-capacitance based touch sensing and the matrix type suitable for mutual-capacitance based touch sensing.

Such a hybrid-type touch panel TSP has an electrode arrangement structure and an electrode connection structure for causing a charge transfer path by a touch to be disconnected at several points. According to the hybrid-type touch panel TSP, charges occurred at the actual touch points n1 and n2 cannot be transferred to adjacent points at which the ghost phenomenon may be caused. The hybrid-type may be referred to as a matrix type with a charge transfer path disconnected at several points.

Figure 7:
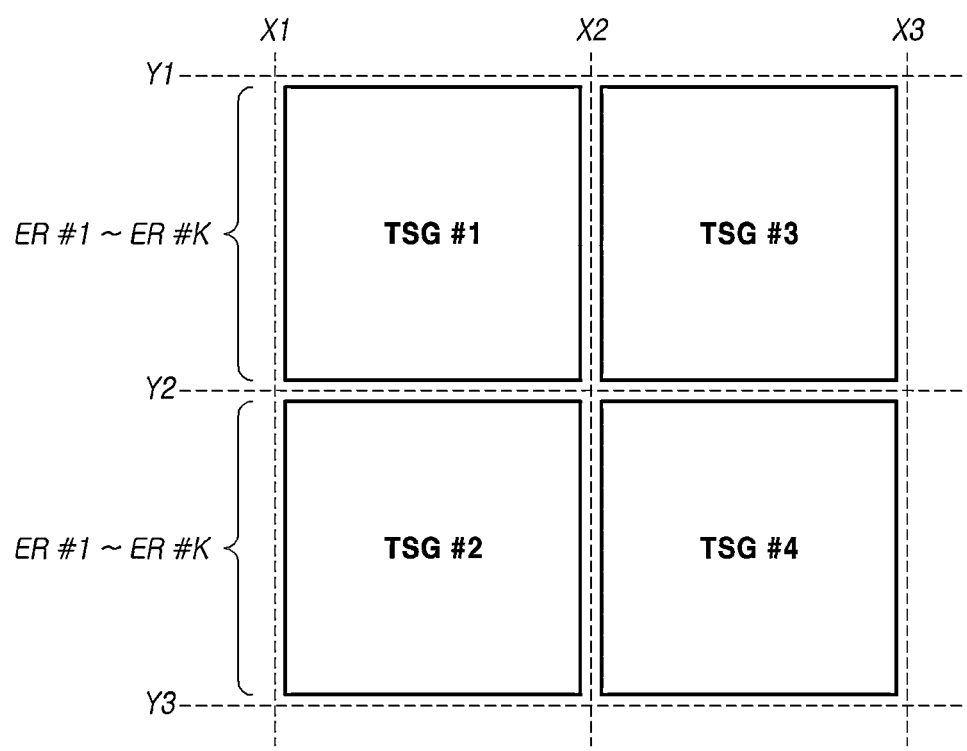
FIG. 7 is a diagram illustrating a plurality of touch sensor groups in a touch panel according to embodiments of the present disclosure.

FIG. 7 is a diagram illustrating a plurality of touch sensor groups (TSG #1, TSG #2, . . . ) in a hybrid-type touch panel TSP according to embodiments of the present disclosure.

Referring to FIG. 7, the hybrid-type touch panel TSP can include the plurality of touch sensor groups (TSG #1, TSG #2, . . . ). Hereinafter, it is assumed, for the purposes of explanation only, that the touch panel TSP includes four touch sensor groups (TSG #1, TSG #2, TSG #3, TSG #4), however the hybrid-type touch panel TSP may include more than four touch sensor groups, for example six, eight, nine, ten, twelve, and so on and so forth. The touch sensor groups are arranged in a 2D array having rows and columns. The number of rows may be equal to the number of columns, or alternatively the number of rows may be different than the number of columns. The following description is also applicable to the hybrid-type touch panel TSP that includes more than four touch sensor groups.

The touch sensor groups may correspond to an equal number of areas in the touch screen panel TSP and may be defined by intersection of a plurality of horizontal and a plurality of vertical lines, for example as shown in FIGS. 7-14, the four touch sensor groups (TSG #1, TSG #2, TSG #3, TSG #4) correspond to four areas defined by intersection of three horizontal lines (Y1, Y2, Y3) and three vertical lines (X1, X2, X3).

Each of the four touch sensor groups (TSG #1, TSG #2, TSG #3, TSG #4) can include K electrode rows (ER #1~ER #K).

The 'K' represents the number of electrode rows included in each of the touch sensor groups (TSG #1, TSG #2, TSG #3, TSG #4), i.e. in each of the four touch sensor groups (TSG #1, TSG #2, TSG #3, TSG #4) of FIGS. 7-14, and is a natural number greater than or equal to 4.

Further, the 'K' may be even or odd.

Hereinafter, referring to FIGS. 8A, 8B and 8C, discussions are more specifically conducted on the hybrid-type touch panel TSP where the 'K' is even. Thereafter, referring to FIGS. 9A and 9B, discussions are more specifically conducted on the hybrid-type touch panel TSP where the 'K' is odd.

Figure 8A:
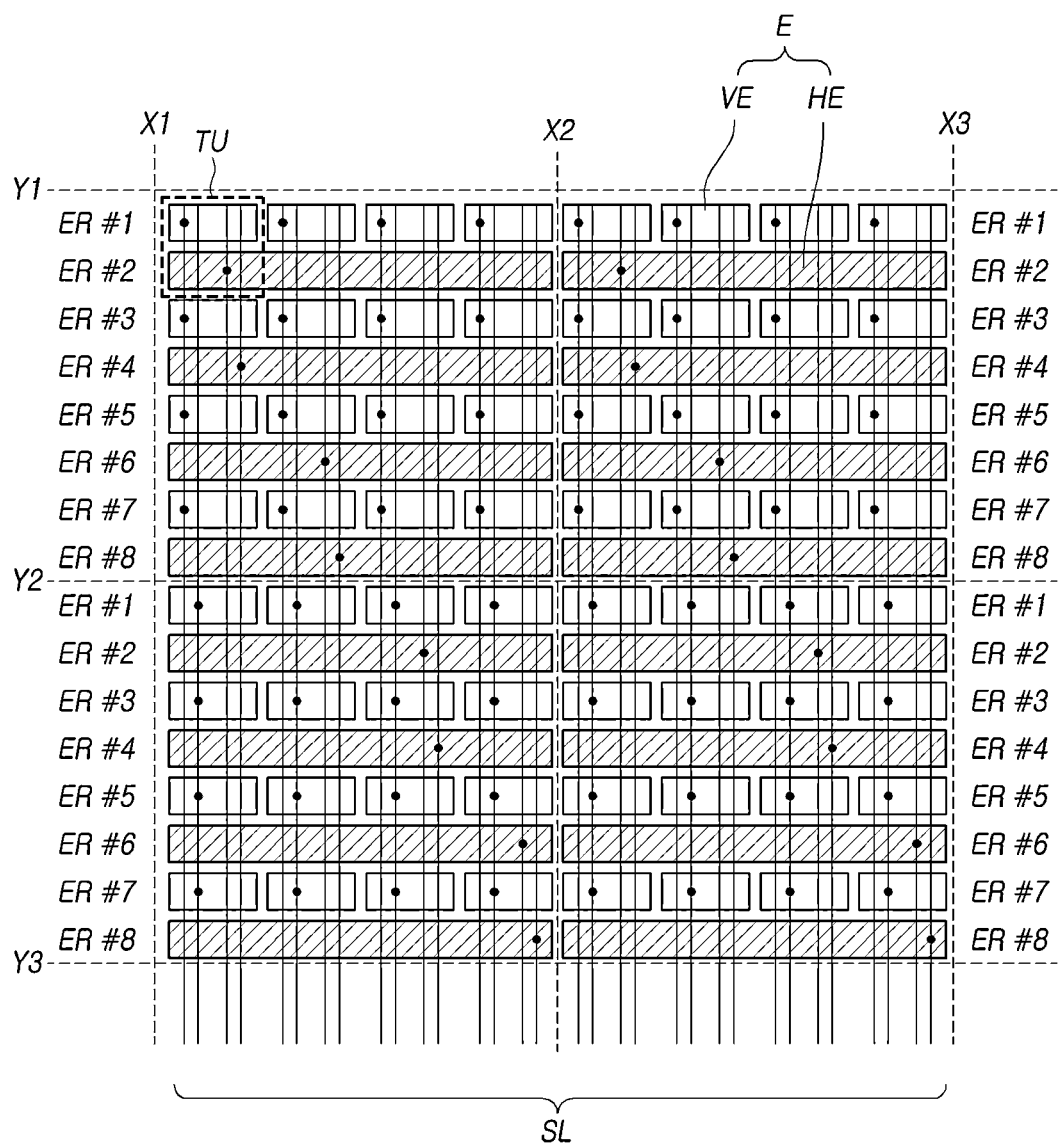
Figure 8B:
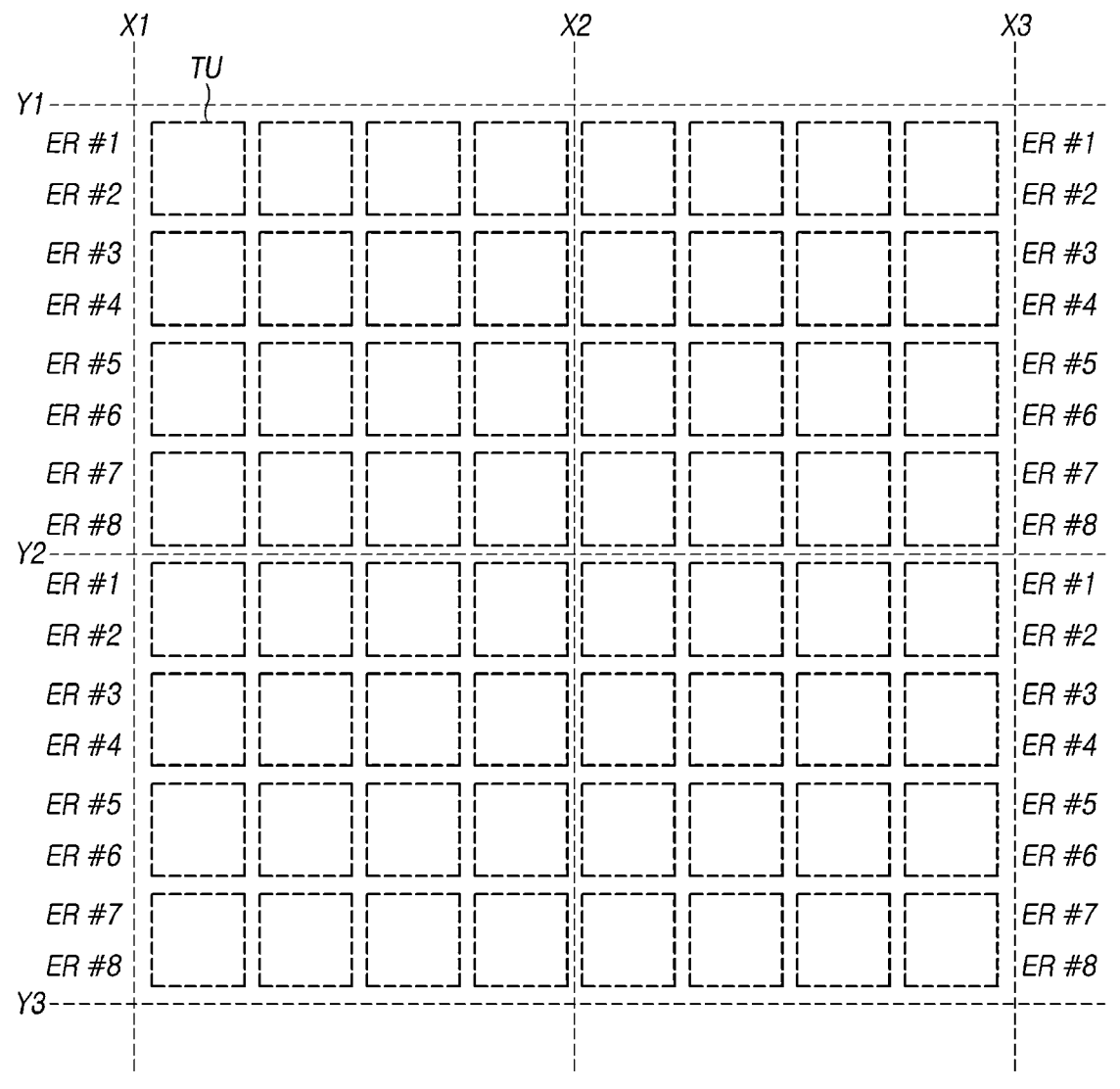
Figure 8C:
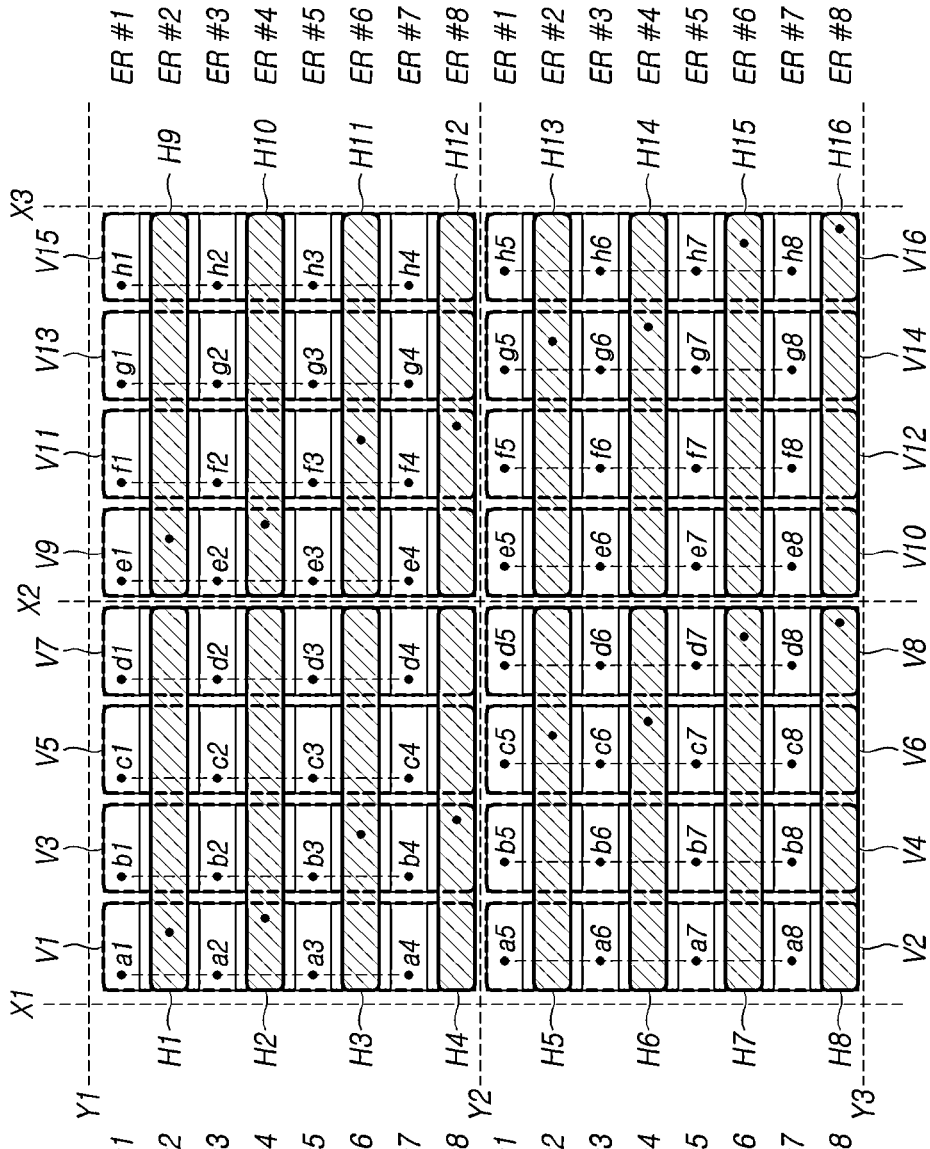

FIGS. 8A, 8B and 8C are diagrams illustrating the hybrid-type touch panel TSP including, as an example, four touch sensor groups (TSG #1, TSG #2, TSG #3, TSG #4) according to the present technique.

As illustrated in FIGS. 8A, 8B and 8C, the number of electrode rows included in each of the touch sensor groups (TSG #1, TSG #2, TSG #3, TSG #4), that is, the K, may be even.

In embodiments of FIGS. 8A, 8B and 8C, the K, for an example but not limited to, is 8. It is assumed that the K is 8 in discussions with regard to FIGS. 8A, 8B and 8C. The following discussion is also applicable when K is even but not equal to 8.

Referring to FIGS. 8A, 8B and 8C, the touch sensor groups (TSG #1, TSG #2, TSG #3, TSG #4) include a first touch sensor group TSG #1 and a second touch sensor group TSG #2.

A plurality of signal lines SL for electrically connecting a plurality of electrodes E, i.e. touch electrodes, included in the first touch sensor group TSG #1 to the touch driving circuit TDC can overlap all or part of the area of the second touch sensor group TSG #2, and be insulated from a plurality of electrodes E, i.e. touch electrodes, included in the second touch sensor group TSG #2 in the touch panel TSP.

Each of the four touch sensor groups (TSG #1, TSG #2, TSG #3, TSG #4) can include first to eighth (when K=8) electrode rows (ER #1~ER #8), or first to nth (when K=n which is an even number) electrode rows.

At least two electrodes VE, which may also be referred to as short electrodes or first electrodes VE, can be arranged in each of odd-numbered electrode rows (ER #1, ER #3, ER #5, ER #7) of the first to eighth (K=8) electrode rows (ER #1~ER #8) in the area of each of the four touch sensor groups (TSG #1, TSG #2, TSG #3, TSG #4) i.e. first to nth (K=n, even) electrode rows in the area of each of the touch sensor groups. In the area of each of the touch sensor groups, a plurality of the electrodes VE may be arranged in each of the odd-numbered electrode rows and the electrodes VE arranged in two or more of the odd-numbered electrode rows form a column arrangement, i.e., as shown in FIG. 8A, the electrodes VE of the odd-numbered electrode rows (ER #1, ER #3, ER #5, ER #7) form four columns within the area of each touch sensor group i.e. for example the electrodes VE at the left hand side of FIG. 8A in the electrode rows ER #1, ER #3, ER #5, ER #7 of the first touch sensor groups (TSG #1) form one such column, the electrodes VE adjacent to the electrode VE at the left hand side of FIG. 8A in the electrode rows ER #1, ER #3, ER #5, ER #7 of the first touch sensor groups (TSG #1) form another such column, and so on and so forth.

In the area of each of the four touch sensor groups (TSG #1, TSG #2, TSG #3, TSG #4), one electrode HE, which may also be referred to as long electrode or second electrode HE, can be arranged in each of even-numbered electrode rows (ER #2, ER #4, ER #6, ER #8) of the first to eighth electrode rows (ER #1~ER #8), i.e., first to nth (K=n, even) electrode rows in the area of each of the touch sensor groups.

In the area of each of the four touch sensor groups (TSG #1, TSG #2, TSG #3, TSG #4), the electrode HE arranged in each of even-numbered electrode rows (ER #2, ER #4, ER #6, ER #8) can be connected to a different signal line SL from one another. In other words, each electrode HE can be connected to the touch driving circuit TDC via a distinct signal line SL which may not electrically connect any of the other electrodes HE or the electrodes VE to the touch driving circuit TDC.

In the area of each of the four touch sensor groups (TSG #1, TSG #2, TSG #3, TSG #4), four electrodes VE arranged in an identical column, i.e. the same column, among the at least two electrodes VE arranged in each of odd-numbered electrode rows (ER #1, ER #3, ER #5, ER #7) can be electrically connected to an identical or same signal line SL.

In the area of each of the four touch sensor groups (TSG #1, TSG #2, TSG #3, TSG #4), the size of each of the at least two electrodes VE arranged in each of odd-numbered electrode rows (ER #1, ER #3, ER #5, ER #7) may be smaller than the size of the electrode HE arranged in each of even-numbered electrode rows (ER #2, ER #4, ER #6, ER #8).

In the area of each of the four touch sensor groups (TSG #1, TSG #2, TSG #3, TSG #4), the number (4, in the example of FIG. 8A but not limited thereto) of electrodes arranged in each of odd-numbered electrode rows (ER #1, ER #3, ER #5, ER #7) may be identical to the number (4, in the example of FIG. 8A but not limited thereto) of even-numbered electrode rows (ER #2, ER #4, ER #6, ER #8).

In the area of each of the four touch sensor groups (TSG #1, TSG #2, TSG #3, TSG #4), all electrodes VE arranged in an identical electrode column in odd-numbered electrode rows (ER #1, ER #3, ER #5, ER #7) of the first to eighth electrode rows (ER #1 ER #8) are connected to one signal line SL, and then operate as one touch electrode (one touch sensor).

In the area of each of the four touch sensor groups (TSG #1, TSG #2, TSG #3, TSG #4), a length in the column direction, i.e. a direction in which a column extends, of the electrode HE arranged in each of even-numbered electrode rows (ER #2, ER #4, ER #6, ER #8) may be smaller than a length in the row direction i.e. a direction in which a row extends, thereof, as may be seen in FIG. 8A i.e. a length in the row direction is greater than a length in the column direction.

In the area of each of the four touch sensor groups (TSG #1, TSG #2, TSG #3, TSG #4), a signal line SL connected to the electrode HE arranged in each of even-numbered electrode rows (ER #2, ER #4, ER #6, ER #8) can be arranged in the column direction.

In the area of each of the four touch sensor groups (TSG #1, TSG #2, TSG #3, TSG #4), a signal line SL for electrically connecting between four electrodes VE arranged in an identical column among at least two electrodes arranged in each of odd-numbered electrode rows (ER #1, ER #3, ER #5, ER #7) can be arranged in the column direction.

Referring to FIG. 8A, when briefly discussing the above described structure again, the touch panel has an electrode arrangement structure in which relatively small-sized electrodes (VE) are arranged in odd-numbered electrode rows (or even-numbered electrode rows) as one type of electrode (E), and relatively large-sized electrodes (HE) are arranged in even-numbered electrode rows (or odd-numbered electrode rows) as another type of electrode (E), and a signal line arrangement and connection structure, in which small-sized electrodes (VE) corresponding to a certain number (4 in the example of FIG. 8A) arranged in an identical column (or an identical row) may be electrically connected to one another through a signal line (SL), and each of the large-sized electrodes (HE) may be electrically connected to a signal line (SL). Electrodes (E) arranged in electrode rows (ER #1, ER #2, . . . ) herein may have two types of sizes. Hereinafter, a relatively small-sized electrode (E) of the electrodes may be referred to as a small-sized electrode (VE), a first electrode, or a vertical electrode, and a relatively large-sized electrode (E) of the electrodes may be referred to as a large-sized electrode (HE), a second electrode, or a horizontal electrode. For example, a size of the large-sized electrode (HE) may correspond to (K/2) times a size of the small-sized electrode (VE). In accordance with the embodiment of FIG. 8 when K=8, a size of a large-sized electrode HE may be 4 (=K/2=8/2) times a size of a small-sized electrode (VE).

Referring to FIG. 8A, the hybrid-type touch panel TSP has the electrode arrangement structure and the signal line arrangement and connection structure described above; therefore, a plurality of touch units (TU) may be formed in the hybrid-type touch panel TSP. Each of the plurality of touch units (TU) may represent a touch coordinate point (a touch point) distinguished from one another or an area corresponded to the touch coordinate point. Each of the plurality of touch units (TU) may include one small-sized electrode (VE), and/or include a portion with a size corresponding to the one small-sized electrode (VE) in a large-sized electrode (HE). Each of the plurality of touch units (TU) may correspond to an area (a location or point) in which a plurality of horizontal touch electrodes (H1~H16) and a plurality of vertical touch electrodes (V1~V16) intersect each other, which will be discussed below referring to FIG. 8C.

In other words, the plurality of vertical electrodes (VE) included in the hybrid-type touch panel TSP may include a first vertical electrode (VE) and a second vertical electrode (VE). The plurality of horizontal electrodes may include a first horizontal electrode (HE) and a second horizontal electrode (HE).

A plurality of signal lines may include a first signal line (SL), a second signal line (SL), and a third signal line (SL).

The first signal line (SL) may be electrically connected to the first vertical electrode (VE) and the second vertical electrode (VE); the second signal (SL) line may be electrically connected to the first horizontal electrode (HE); and the third signal line (SL) may be electrically connected to the second horizontal electrode (HE).

The first signal line (SL) may overlap with the first vertical electrode (VE), the second vertical electrode (VE), the first horizontal electrode (HE), and the second horizontal electrode (HE); the second signal (SL) line may overlap with the first horizontal electrode (HE) and the second horizontal electrode (HE); and the third signal line (SL) ma overlap with the second horizontal electrode (HE).

The first signal line (SL) may not overlap with the second signal line (SL) and the third signal line (SL) within all or at least a portion of an active area of the touch display device. The second signal line (SL) may not overlap with the third signal line (SL) within all or at least a portion of the active area of the touch display device.

A size of the first horizontal electrode (HE) may be greater than that of the first vertical electrode (VE). A size of the second horizontal electrode (HE) may be greater than that of the second vertical electrode (VE).

The first signal line (SL) may be electrically connected to the first vertical electrode (VE) through at least one first contact hole, and the first signal line (SL) may be electrically connected to the second vertical electrode (VE) through at least one second contact hole.

The touch panel (TSP) may further include a plurality of data lines and a plurality of gate lines. At least one of the plurality of gate lines may overlap with the first signal line (SL), the second signal line (SL), and the third signal line (SL).

A distance between the first vertical electrode (VE) and the touch driving circuit (TDC) may be greater than that between the first horizontal electrode (HE) and the touch driving circuit (TDC). A distance between the first horizontal electrode (HE) and the touch driving circuit (TDC) may be greater than that between the second vertical electrode (VE) and the touch driving circuit (TDC). A distance between the second vertical electrode (VE) and the touch driving circuit (TDC) may be greater than that between the second horizontal electrode (HE) and the touch driving circuit (TDC).

FIG. 8B is a diagram illustrating a plurality of touch units TU disposed in the hybrid-type touch panel TSP. According to the structure described above, such a hybrid-type touch panel TSP has 64 (=8*8) touch units TU. Here, each touch unit TU may denote a touch coordinate point distinct from one another. All touch units TU may have an identical size, or one or more of the touch units TU may have a different size from one or more remaining touch units.

In other words, referring to FIG. 8B, as electrodes E and signal lines SL arranged in the hybrid-type touch panel TSP are connected according to the methods described above, 64 touch units can be disposed in the hybrid-type touch panel TSP. The 64 touch units TU are distributed in four areas defined by three horizontal lines (Y1, Y2, and Y3) and three vertical lines (X1, X2, and X3). Here, as described above, the four areas can correspond to the four touch sensor groups (TSG #1, TSG #2, TSG #3, and TSG #4).

That is, in an identical size, the hybrid-type touch panel TSP may have the same number (64) of touch coordinate points as the split-type touch panel of FIG. 6.

In other words, the hybrid-type touch panel TSP may have the same level of touch sensing performance as the split-type touch panel of FIG. 6.

Figure 16:
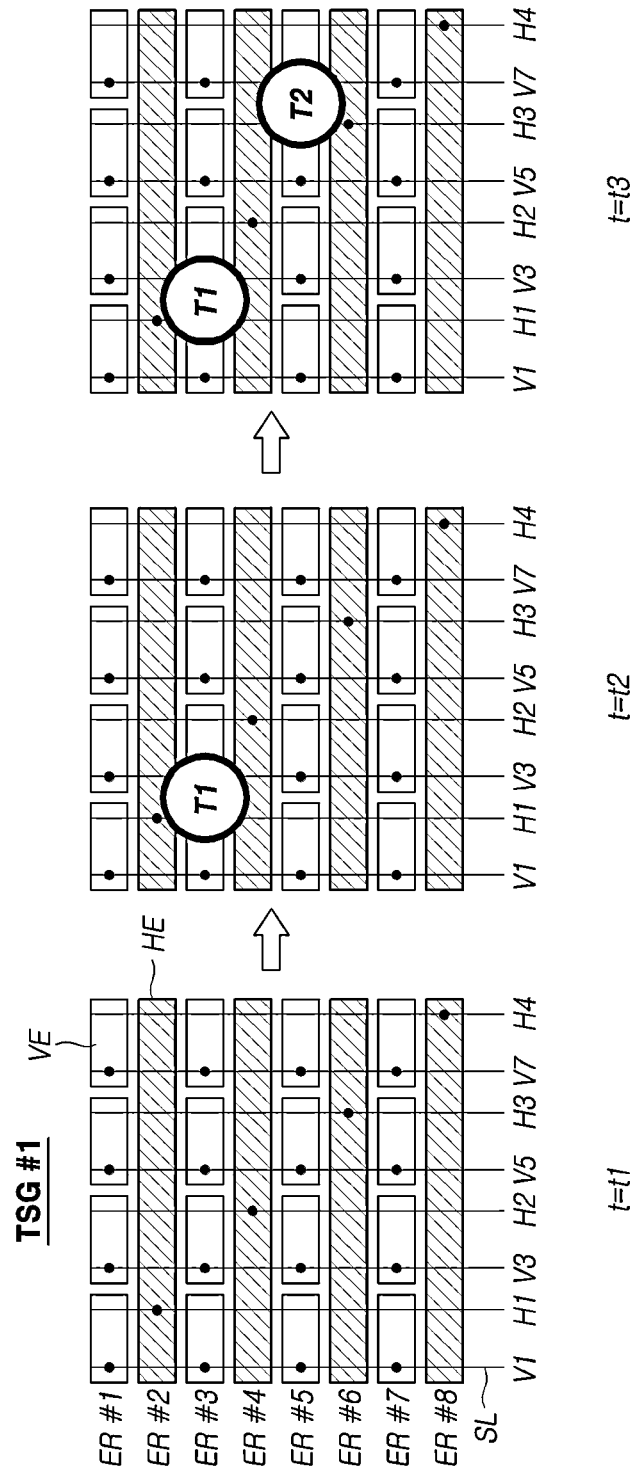
FIGS. 16 and 17 are other diagrams illustrating a touch sensing method of preventing or overcoming a ghost by using a sensing scheme changing technique when multiple touches occur in the touch display device according to embodiments of the present disclosure.

Referring to FIG. 8C in combination with FIG. 8A, in the area of each of the four touch sensor groups (TSG #1, TSG #2, TSG #3, TSG #4), electrodes VE arranged in an identical column among 16 electrodes VE arranged in odd-numbered electrode rows (ER #1, ER #3, ER #5, ER #7) in the 8 electrode rows (ER #1~ ER #8) can be connected to one another by a signal line SL. As shown in FIG. 8A, 16 electrodes VE arranged in each touch sensor group, are arranged in four columns within each touch sensor group, and the electrodes VE arranged in the same column of each touch sensor group are connected by the same signal line SL i.e. the electrodes VE arranged in each of the four columns of each touch sensor group are connected to the touch driving circuit by a distinct signal line SL. Simply put, in example of FIG. 8A, each touch sensor group has four (number four is an example) columns, each column has four (number four is an example) electrodes VE connected to the same signal line SL, thereby the four columns are connected to the touch driving circuit via four signal lines SL, respectively.

More specifically, as depicted in FIG. 8C, among 16 electrodes VE (a1~a4, b1~b4, c1~c4, d1~d4) arranged in odd-numbered electrode rows (ER #1, ER #3, ER #5, ER #7) in 8 electrode rows (ER #1~ ER #8) in an area of a first touch sensor group TSG #1, i) 4 electrodes (a1~a4) arranged in a first column are connected to one another via one signal line SL, say a signal line SL, and forms a first vertical touch electrode V1, ii) 4 electrodes (b1~b4) arranged in a second column are connected to one another via one signal line SL, say another signal line SL, and forms a third vertical touch electrode V3, iii) 4 electrodes (c1~c4) arranged in a third column are connected to one another via one signal line SL, say yet another signal line SL, and forms a fifth vertical touch electrode V5, and iv) 4 electrodes (d1~d4) arranged in a fourth column are connected to one another via one signal line SL, say further another signal line SL, and forms a seventh vertical touch electrode V7.

Similarly, among 16 electrodes (a5~a8, b5~b8, c5~c8, d5~d8) arranged in odd-numbered electrode rows (ER #1, ER #3, ER #5, ER #7) in 8 electrode rows (ER #1~ER #8) in an area of a second touch sensor group TSG #2, i) 4 electrodes (a5~a8) arranged in a first column are connected to one another and forms a second vertical touch electrode V2, ii) 4 electrodes (b5~b8) arranged in a second column are connected to one another and forms a fourth vertical touch electrode V4, iii) 4 electrodes (c5~c8) arranged in a third column are connected to one another and forms a sixth vertical touch electrode V6, and iv) 4 electrodes (d5~d8) arranged in a fourth column are connected to one another and forms a eighth vertical touch electrode V8.

Similarly, among 16 electrodes (e1~e4, f1~f4, g1~g4, h1~h4) arranged in odd-numbered electrode rows (ER #1, ER #3, ER #5, ER #7) in 8 electrode rows (ER #1~ER #8) in an area of a third touch sensor group TSG #3, i) 4 electrodes (e1~e4) arranged in a first column are connected to one another and forms a ninth vertical touch electrode V9, ii) 4 electrodes (f1~f4) arranged in a second column are connected to one another and forms a eleventh vertical touch electrode V11, iii) 4 electrodes (g1~g4) arranged in a third column are connected to one another and forms a thirteenth vertical touch electrode V13, and iv) 4 electrodes (h1~h4) arranged in a fourth column are connected to one another and forms a fifteenth vertical touch electrode V15.

Similarly, among 16 electrodes (e5~e8, f5~f8, g5~g8, h5~h8) arranged in odd-numbered electrode rows (ER #1, ER #3, ER #5, ER #7) in 8 electrode rows (ER #1~ER #8) in an area of a fourth touch sensor group TSG #4, i) 4 electrodes (e5~e8) arranged in a first column are connected to one another and forms a tenth vertical touch electrode V10, ii) 4 electrodes (f5~f8) arranged in a second column are connected to one another and forms a twelfth vertical touch electrode V12, iii) 4 electrodes (g5~g8) arranged in a third column are connected to one another and forms a fourteenth vertical touch electrode V14, and iv) 4 electrodes (h5~h8) arranged in a fourth column are connected to one another and forms a sixteenth vertical touch electrode V16.

As described above, in the area of each of the four touch sensor groups (TSG #1, TSG #2, TSG #3, TSG #4), the electrodes VE arranged in an identical column among 16 electrodes VE arranged in odd-numbered electrode rows (ER #1, ER #3, ER #5, ER #7) in the 8 electrode rows (ER #1~ER #8) can be connected to one another by the signal line SL, and thus 16 vertical touch electrodes (V1~V16) can be formed. To form the 16 vertical touch electrodes (V1~V16) sixteen signal lines SL will be needed.

In the area of each of the four touch sensor groups (TSG #1, TSG #2, TSG #1, TSG #4), one electrode HE arranged in each of even-numbered electrode rows (ER #2, ER #4, ER #6, ER #8) in 8 electrode rows (ER #1~ER #8) corresponds to one horizontal touch electrode.

More specifically, 4 electrodes HE arranged in even-numbered electrode rows (ER #2, ER #4, ER #6, ER #8) in 8 electrode rows (ER #1~ER #8) in the area of the first touch sensor group TSG #1 form 4 horizontal touch electrodes (H1~H4).

4 electrodes HE arranged in even-numbered electrode rows (ER #2, ER #4, ER #6, ER #8) in 8 electrode rows (ER

1~ER #8) in the area of the second touch sensor group TSG #2 form 4 horizontal touch electrodes (H5~H8).

4 electrodes HE arranged in even-numbered electrode rows (ER #2, ER #4, ER #6, ER #8) in 8 electrode rows (ER #1~ER #8) in the area of the third touch sensor group TSG #3 form 4 horizontal touch electrodes (H9~H12).

4 electrodes HE arranged in even-numbered electrode rows (ER #2, ER #4, ER #6, ER #8) in 8 electrode rows (ER #1~ER #8) in the area of the fourth touch sensor group TSG #4 form 4 horizontal touch electrodes (H13~H16).

As described above, since one electrode HE arranged in each of even-numbered electrode rows (ER #2, ER #4, ER #6, ER #8) in 8 electrode rows (ER #1 ER #8) in the area of each of the four touch sensor groups (TSG #1, TSG #2, TSG #1, TSG #4) forms one horizontal touch electrode, thus, a total of 16 horizontal touch electrodes (H1 H16) can be formed. To form the 16 horizontal touch electrodes (H1~H16) sixteen signal lines SL will be needed.

Accordingly, in FIG. 8C, in combination with FIG. 8A, the hybrid-type touch panel TSP can include 16 vertical touch electrodes (V1~V16) and 16 horizontal touch electrodes (H1~H16). That is, the hybrid-type touch panel TSP shown in FIG. 8C include a total of 32 touch electrodes (V1~V16, H1~H16). As shown in FIG. 8A, the hybrid-type touch panel TSP shown in FIG. 8C will include a total of 32 signal lines SL corresponding the 32 touch electrodes (V1~V16, H1~H16).

Thus, in the case of the hybrid-type touch panel TSP, the touch driving circuit TDC needs 32 touch channels corresponding to the total of 32 touch electrodes (V1~V16, H1 H16).

While the split-type touch panel TSP shown in FIG. 6 includes 64 touch electrodes TE, the hybrid-type touch panel TSP shown in FIGS. 8A, 8B and 8C includes reduced 32 touch electrodes (V1~V16, H1~H16).

Further, while the touch driving circuit TDC needs 64 touch channels when the split-type touch panel TSP shown in FIG. 6 is used, the touch driving circuit TDC needs only 32 touch channels when the hybrid-type touch panel TSP shown in FIGS. 8A, 8B and 8C is used.

Figure 9A:
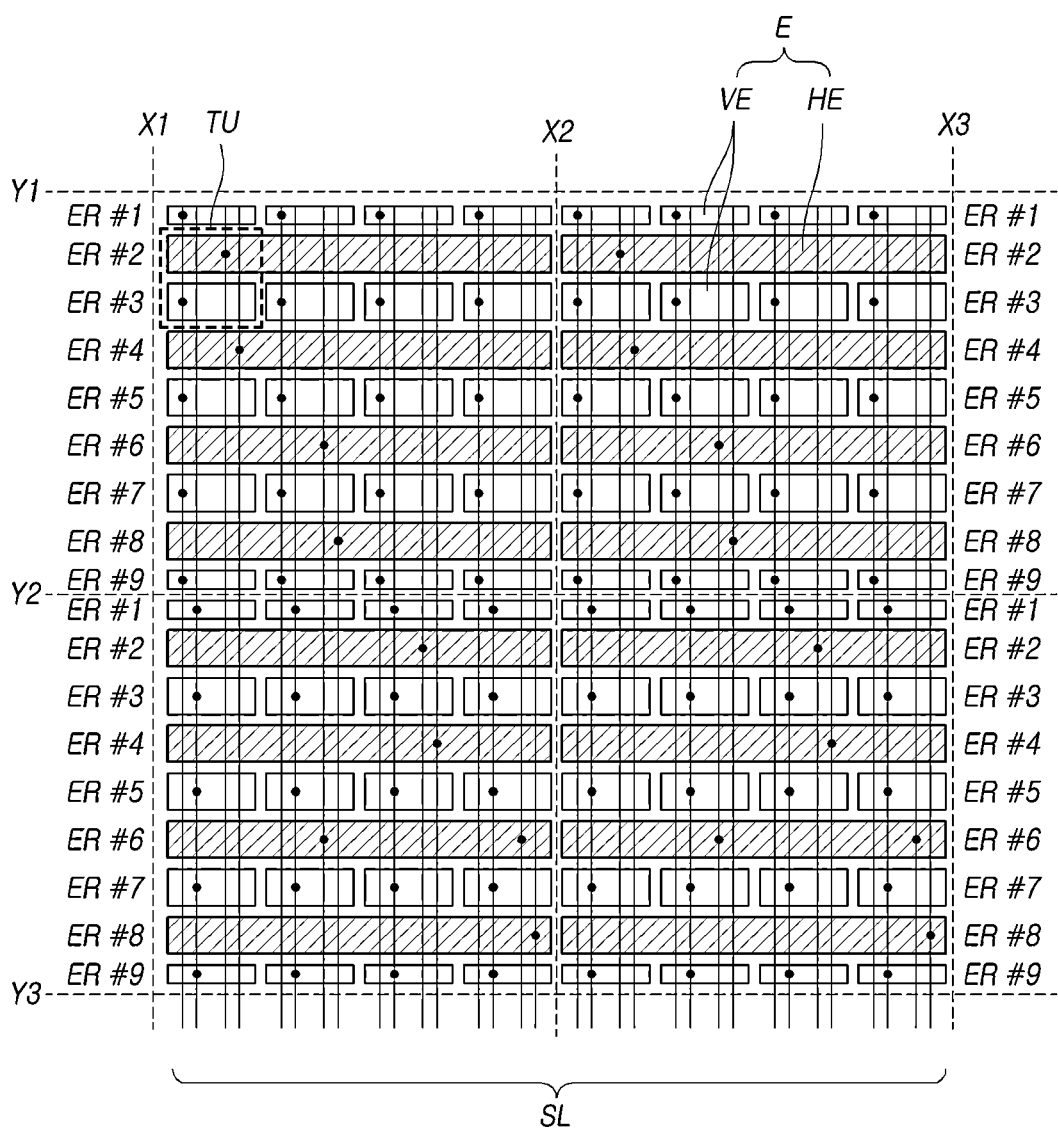
FIGS. 9A and 9B are other diagrams illustrating the hybrid-type touch panel including the plurality of touch sensor groups according to embodiments of the present disclosure.
Figure 9B:
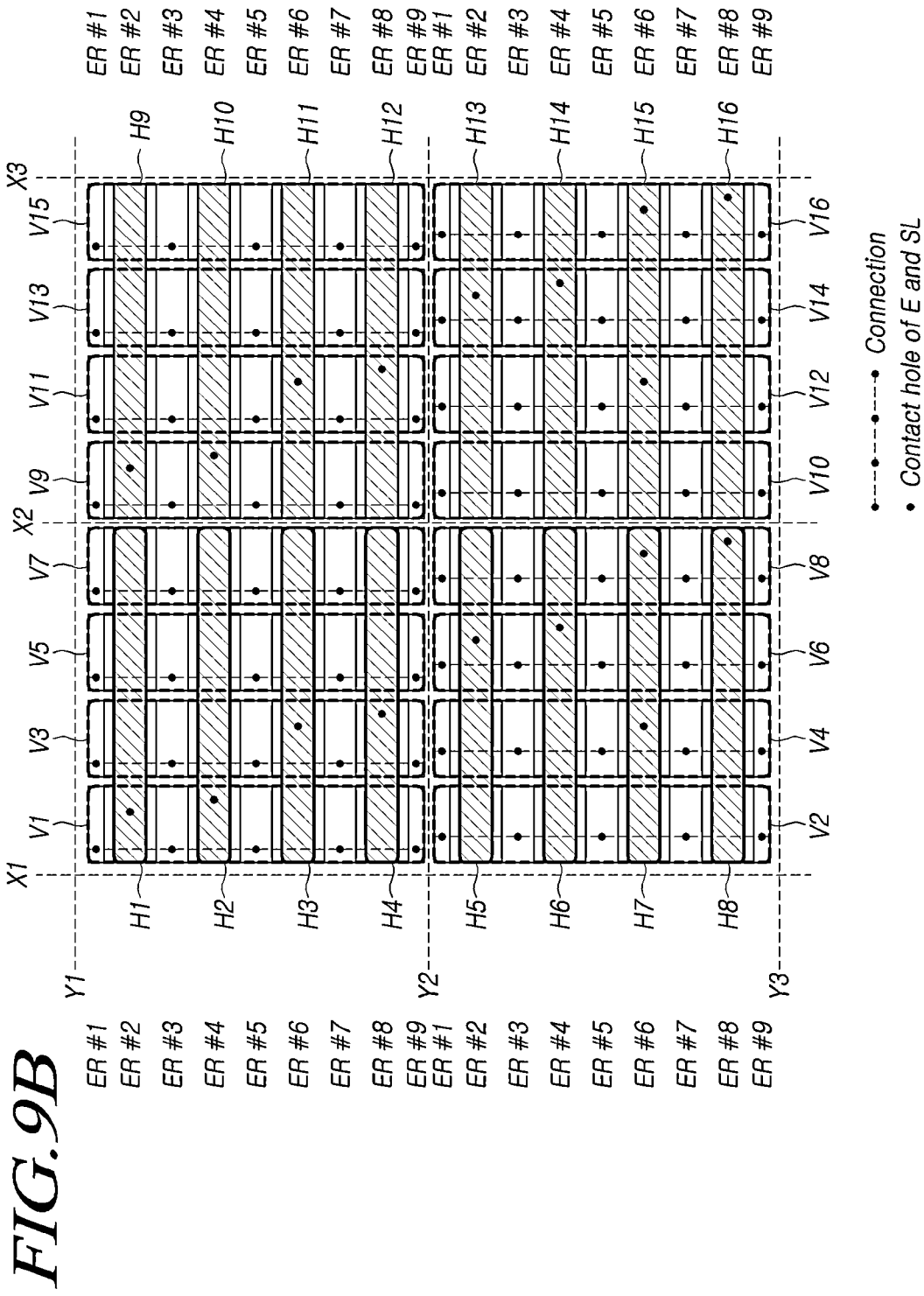

FIGS. 9A and 9B are diagrams illustrating the hybrid-type touch panel TSP including four touch sensor groups (TSG #1, TSG #2, TSG #3, TSG #4) according to embodiments of the present disclosure.

As illustrated in FIGS. 9A and 9B, the number of electrode rows included in each of the four touch sensor groups (TSG #1, TSG #2, TSG #3, TSG #4), that is, the K, may be odd.

Figure 10:
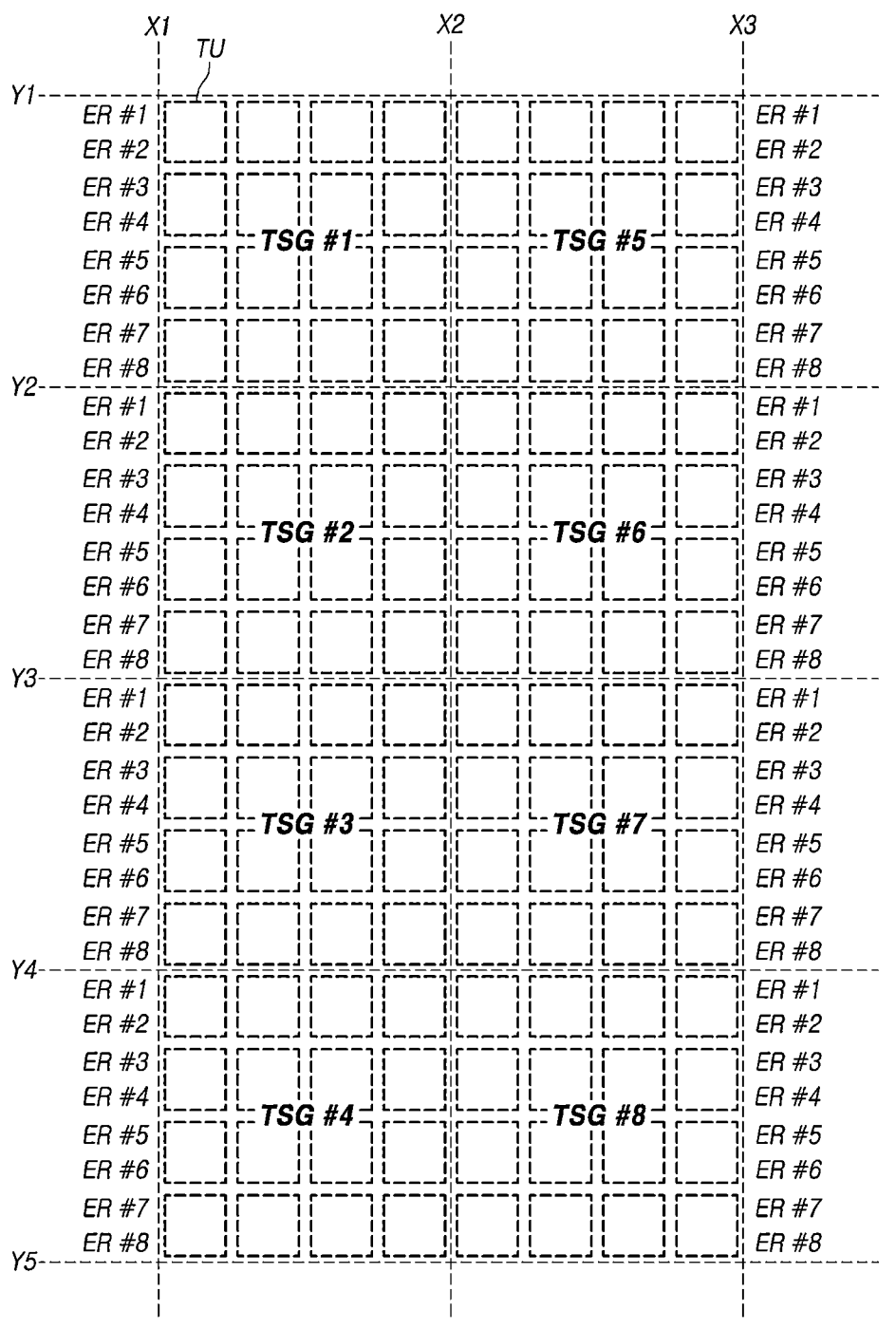

In embodiments of FIGS. 9A and 9B, the K is 9. It may be noted that '9' is used for exemplary purposes only, therefore K can be any other odd number too. The following discussion is applicable to the present technique where K is an odd number. It may also be noted that for the examples of FIGS. 11 and 12, only the points of differences with respect to the examples of FIGS. 8 to 10 are discussed.

When the K is 9, in the area of each of the four touch sensor groups (TSG #1, TSG #2, TSG #3, TSG #4), all electrodes VE arranged in odd-numbered electrode rows (ER #1, ER #3, ER #5, ER #7) may not have the same size.

Referring to FIGS. 9A and 9B, in the area of each of the four touch sensor groups (TSG #1, TSG #2, TSG #3, TSG #4), at least two electrodes VE arranged in each of the first electrode row ER #1 and the ninth electrode row ER #9, i.e. the last electrode row, of odd-numbered electrode rows (ER #1, ER #3, ER #5, ER #7, ER #9) may have a smaller size than at least two electrodes VE arranged in each of remaining odd-numbered electrode rows (ER #3, ER #5, ER #7).

Referring to FIG. 9B, 16 vertical touch electrodes (V1~V16) and 16 horizontal touch electrodes (H1~H16) are formed in the hybrid-type touch panel TSP shown in FIG. 9A.

As in FIG. 9B, this is the same as the hybrid-type touch panel TSP shown in FIG. 8C includes vertical touch electrodes (V1~V16) and 16 horizontal touch electrodes (H1 H16).

However, the difference of the hybrid-type touch panel TSP of FIG. 9B from the hybrid-type touch panel TSP of FIG. 8C is that in the hybrid-type touch panel TSP of FIG. 9B, 5 electrodes arranged in odd-numbered electrode rows (ER #1, ER #3, ER #5, ER #7, ER #9) and in the same column are connected to each other to form 16 vertical touch electrodes (V1~V16). Since the remainder is not substantially different from the hybrid-type touch panel TSP of FIG. 8C, some related configurations discussed above are not repeatedly described for convenience of description.

Generally, as shown in the hybrid-type touch panels TSP of FIGS. 8A to 9C, the hybrid-type touch panels TSP of the present technique includes at least two electrodes E, i.e. the electrodes VE, arranged in each of odd-numbered electrode rows (ER #1, ER #3, ER #5, ER #7, ER #9), and one electrode E, i.e. the electrode HE, arranged in each of even-numbered electrode rows (ER #2, ER #4, ER #6, ER #8), among a first electrode row to a K-th electrode row (ER #1~ER #K) in the area of each of the touch sensor groups (TSG #1, TSG #2, TSG #3, TSG #4).

Alternatively (not shown), the hybrid-type touch panels TSP can include at least two electrodes E, i.e. the electrodes VE, arranged in each of even-numbered electrode rows (ER #2, ER #4, ER #6, ER #8), and one electrode E, i.e. the electrode HE, arranged in each of odd-numbered electrode rows (ER #1, ER #3, ER #5, ER #7, ER #9), among the first to K-th electrode rows (ER #1~ER #K) in the area of each of the touch sensor groups (TSG #1, TSG #2, TSG #3, TSG #4).

In this case i.e. in the non-depicted aforementioned alternative, the electrodes E arranged in each of odd-numbered electrode rows (ER #1, ER #3, ER #5, ER #7, ER #9) can be connected to signal lines SL different from one another.

Also i.e. in the non-depicted aforementioned alternative, electrodes E arranged in an identical or same column of the at least two electrodes E arranged in each of even-numbered electrode rows (ER #2, ER #4, ER #6, ER #8) can be electrically connected to an identical or same signal line SL.

Figure 11A:
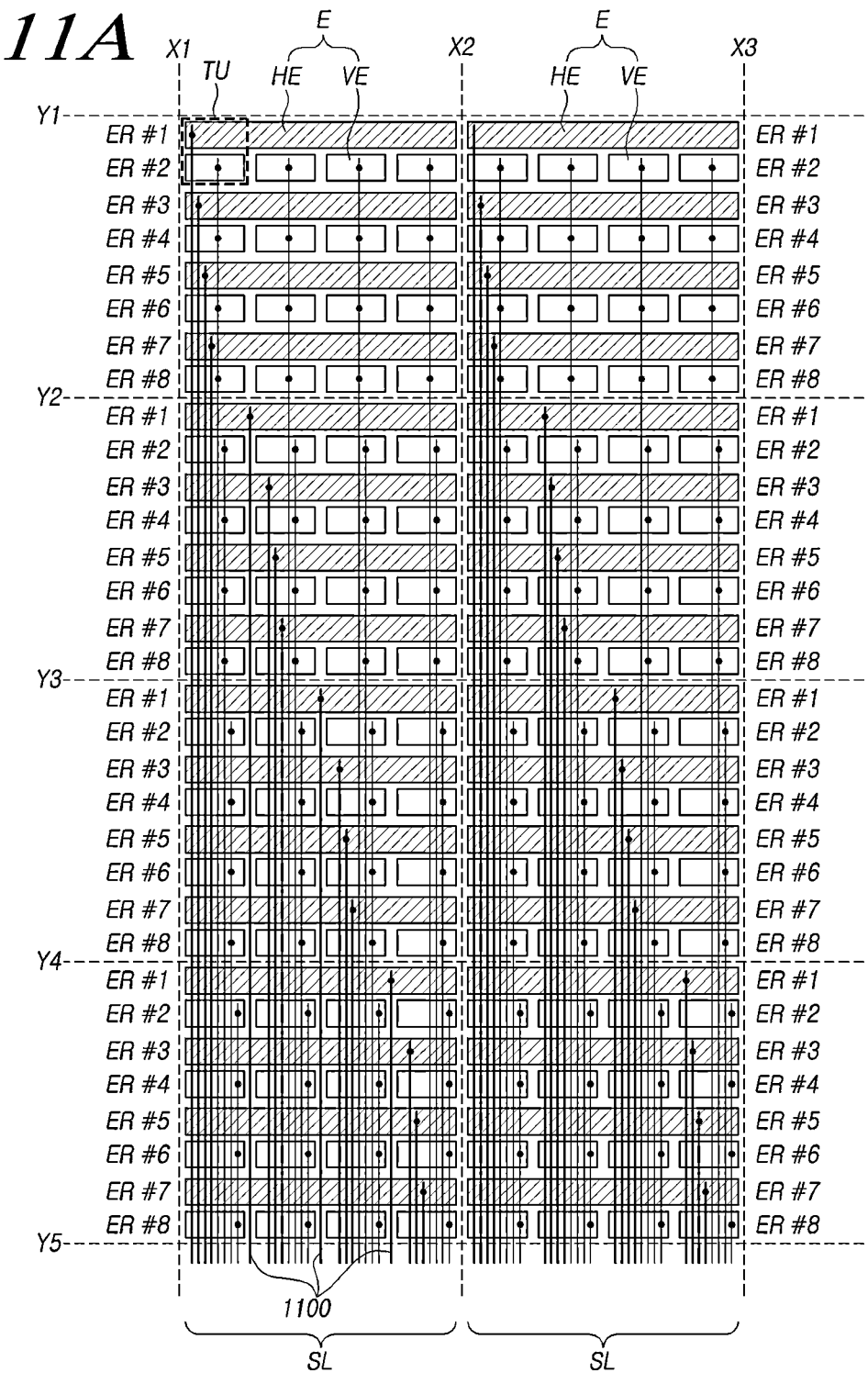
Figure 11B:
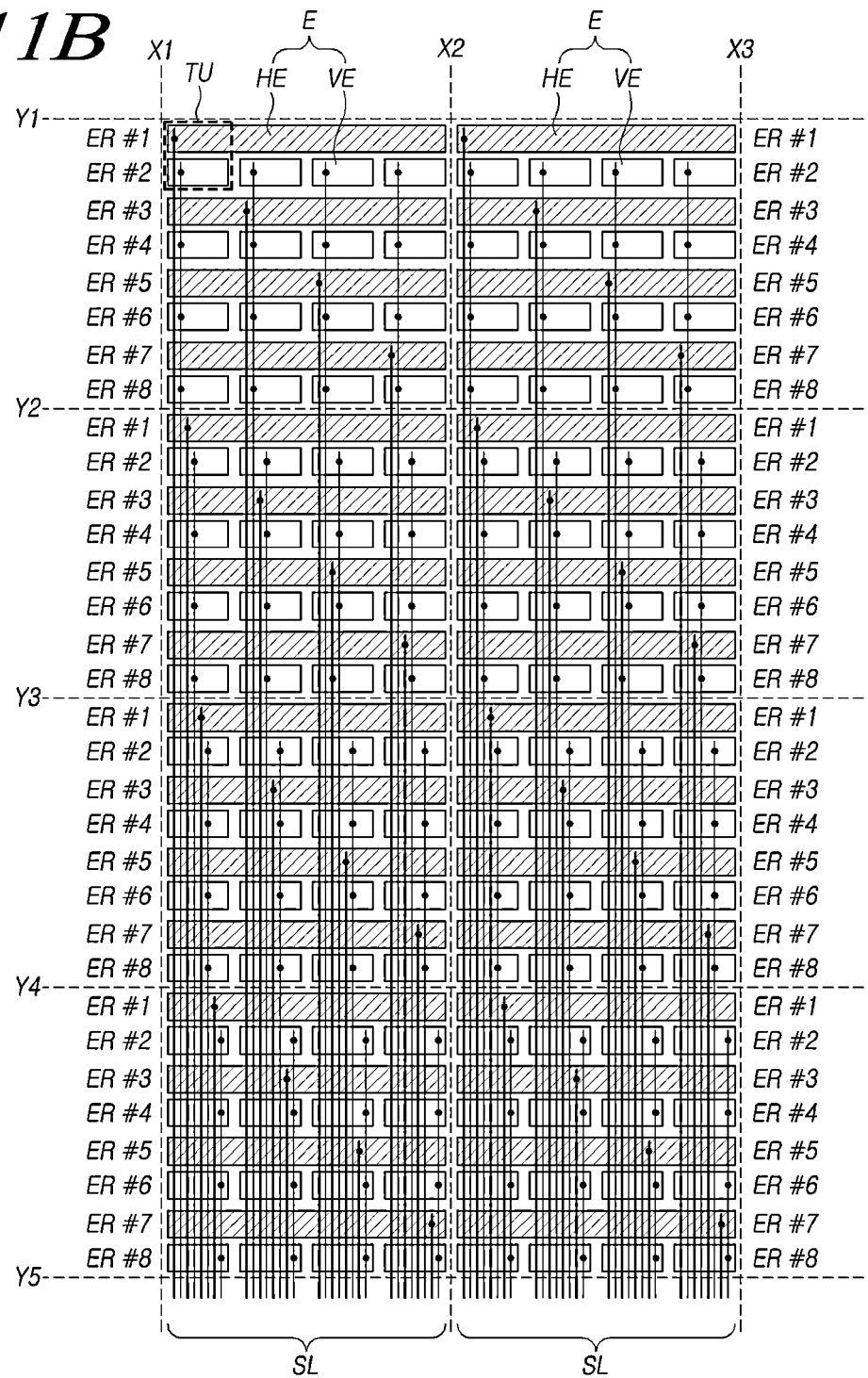
Figure 12:
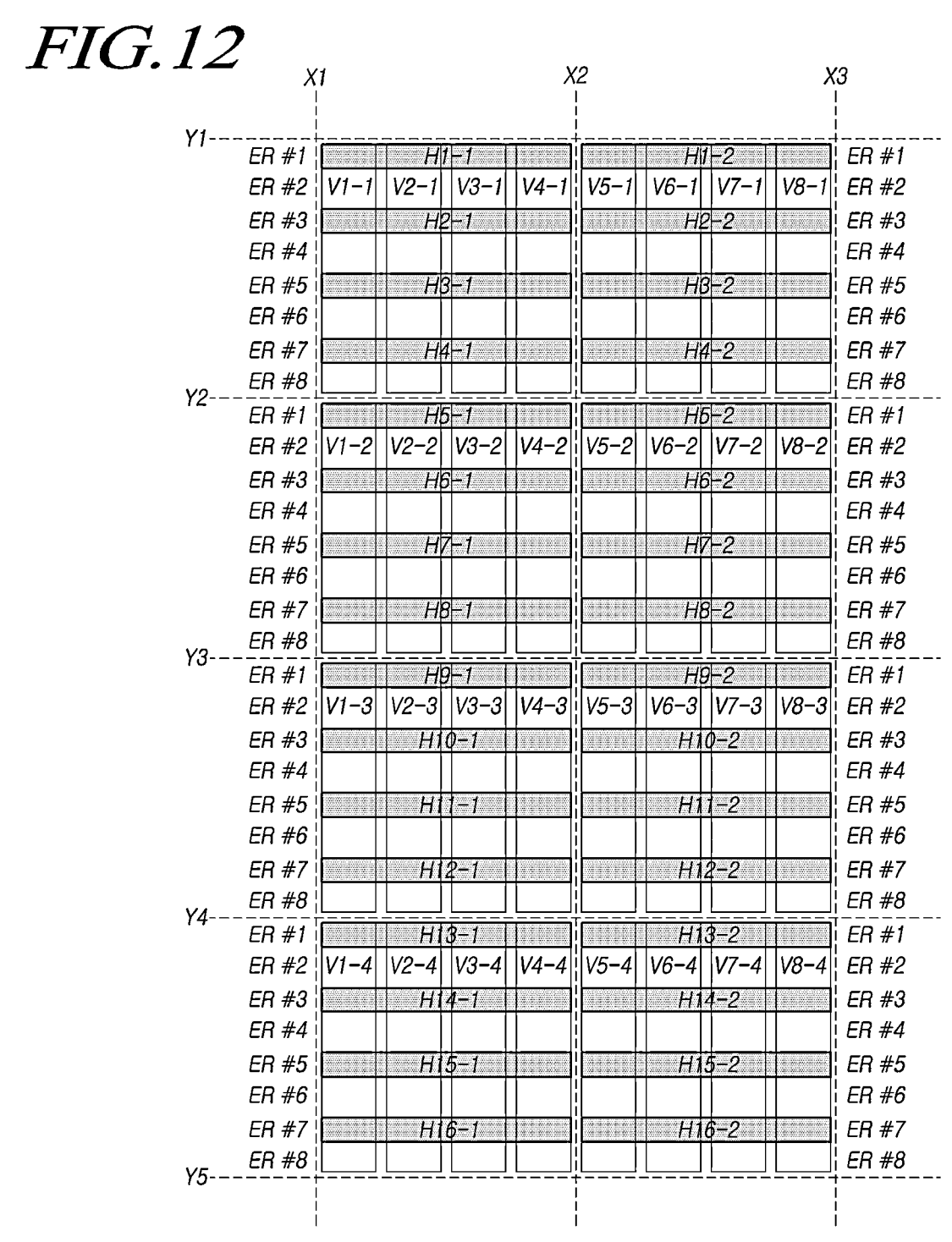

FIGS. 10, 11A, 11B and 12 are other diagrams illustrating the hybrid-type touch panel (TSP) including the plurality of touch sensor groups according to embodiments of the present disclosure. FIGS. 11A and 11B are diagrams illustrating a signal line arrangement and connection structure different from FIGS. 8A and 9A; FIG. 10 is a diagram illustrating, as an embodiment, eight touch sensor groups (TSG #1~TSG #8) for describing the signal line arrangement and connection structure of FIGS. 11A and 11B; and FIG. 12 is a diagram illustrating horizontal touch electrodes (H1-1, H2-1, H3-1, H4-1, . . . , H16-1, H1-2, H2-2, H3-2, H4-2, . . . , H16-2) and vertical touch electrodes (V1-1, V2-1, . . . , V8-1, V1-2, V2-2, . . . , V8-2, V1-3, V2-3, . . . , V8-3, V1-4, V2-4, . . . , V8-4), which are formed according to the signal line arrangement and connection structure of FIGS. 11A and 11B. Embodiments illustrated in FIGS. 11A and 11B will be discussed in conjunction with embodiments illustrated in FIGS. 10 and 12.

Referring to FIG. 10, the eight touch sensor groups (TSG #1~TSG #8) included in the hybrid-type touch panel (TSP)

correspond to eight areas defined by five horizontal lines (Y1, Y2, Y3, Y4, Y5) and three vertical lines (X1, X2, X3).

Each of the eight touch sensor groups (TSG #1~TSG #8) can include eight (K=8) electrode rows (ER #1~ER #8). The eight electrode rows (ER #1~ER #8) can be present in each of the eight touch sensor groups (TSG #1~TSG #8). 16 touch units (TU) that arranged in four rows and four columns can be formed in each of the eight touch sensor groups (TSG #1~TSG #8)

Electrode arrangement structures in FIGS. 11A and 11B are substantially equal to the electrode arrangement structure of FIG. 8A in a basic arrangement scheme. While FIG. 8A illustrates four touch sensor groups (TSG #1~TSG #4), FIGS. 11A and 11B illustrate eight touch sensor groups (TSG #1~TSG #8). Further, while a small-sized electrode (VE) is disposed in the odd numbered electrode row (ER #1) of each of the four touch sensor groups (TSG #1~TSG #4) in the electrode arrangement structure of FIG. 8A, a large-sized electrode (HE) is disposed in the odd numbered electrode row (ER #1) of each of the eight touch sensor groups (TSG #1~TSG #8) in the electrode arrangement structures of 11A and 11B.

As described above, in discussing a structure of the touch panel (TSP) referring to FIGS. 11A and 11B, since electrode arrangement structures of FIGS. 11A and 11B are substantially equal to that of FIG. 8A in a manner where electrodes are arranged, discussion on the electrode arrangement structures is not repeatedly conducted. Accordingly, hereinafter, referring to FIGS. 11A and 11B, discussions will be conducted from a view of a signal line arrangement and connection structure in which some differences from FIG. 8A are present.

Referring to FIGS. 11A, 11B and 12, among 16 small-sized electrodes (VE) arranged in each of eight touch sensor groups (TSG #1~TSG #8), all four small-sized electrodes (VE) arranged in an identical column may be electrically connected through one signal line (SL). Since the four small-sized electrodes (VE) are electrically connected together through the one signal line (SL), one vertical touch electrode can be formed. Accordingly, the four small-sized electrodes (VE) forming the one vertical touch electrode may receive simultaneously an electrical signal from the touch driving circuit (TDC) through the one signal line (SL), or an electrical signal may be simultaneously detected by the touch driving circuit (TDC) from the four small-sized electrodes (VE).

For example, among 16 small-sized electrodes (VE) arranged in a first touch sensor group (TSG #1), four small-sized electrodes (VE) arranged in a first column form a vertical touch electrode V1-1 by being electrically connected to one another through one signal line (SL); four small-sized electrodes (VE) arranged in a second column form a vertical touch electrode V2-1 by being electrically connected to one another through one signal line (SL); four small-sized electrodes (VE) arranged in a third column form a vertical touch electrode V3-1 by being electrically connected to one another through one signal line (SL); and four small-sized electrodes (VE) arranged in a fourth column form a vertical touch electrode V4-1 by being electrically connected to one another through one signal line (SL).

Among 16 small-sized electrodes (VE) arranged in a second touch sensor group (TSG #2), four small-sized electrodes (VE) arranged in a first column form a vertical touch electrode V1-2 by being electrically connected to one another through one signal line (SL); four small-sized electrodes (VE) arranged in a second column form a vertical touch electrode V2-2 by being electrically connected to one another through one signal line (SL); four small-sized electrodes (VE) arranged in a third column form a vertical touch electrode V3-2 by being electrically connected to one another through one signal line (SL); and four small-sized electrodes (VE) arranged in a fourth column form a vertical touch electrode V4-2 by being electrically connected to one another through one signal line (SL).

According to this manner, the total of 32 vertical touch electrodes (V1-1, V2-1, ..., V8-1, V1-2, V2-2, ..., V8-2, V1-3, V2-3, ..., V8-3, V1-4, V2-4, ..., V8-4) are arranged in eight touch sensor groups (TSG #1~TSG #8).

Referring to FIGS. 11A, 11B and 12, four large-sized electrodes (HE) arranged in each of eight touch sensor groups (TSG #1~TSG #8) may be electrically connected to signal lines (SL) different from one another. Thus, the one large-sized electrode (VE) electrically connected to one signal line (SL) may form one horizontal electrode. Accordingly, the one large-sized electrodes (HE) forming the one horizontal touch electrode may receive an electrical signal from the touch driving circuit (TDC) through the one signal line (SL), or an electrical signal may be detected by the touch driving circuit (TDC) from the one large-sized electrodes (HE).

For example, among four large-sized electrodes (HE) arranged in the first touch sensor group (TSG #1), a large-sized electrode (HE) arranged in a first electrode row (ER #1) forms a horizontal touch electrode H1-1 by being electrically connected to one signal line (SL); a large-sized electrode (HE) arranged in a third electrode row (ER #3) forms a horizontal touch electrode H2-1 by being electrically connected to one signal line (SL); a large-sized electrode (HE) arranged in a fifth electrode row (ER #5) forms a horizontal touch electrode H3-1 by being electrically connected to one signal line (SL); and a large-sized electrode (HE) arranged in a seventh electrode row (ER #7) forms a horizontal touch electrode H4-1 by being electrically connected to one signal line (SL).

Among four large-sized electrodes (HE) arranged in the second touch sensor group (TSG #2), a large-sized electrode (HE) arranged in a first electrode row (ER #1) forms a horizontal touch electrode H5-1 by being electrically connected to one signal line (SL); a large-sized electrode (HE) arranged in a third electrode row (ER #3) forms a horizontal touch electrode H6-1 by being electrically connected to one signal line (SL); a large-sized electrode (HE) arranged in a fifth electrode row (ER #5) forms a horizontal touch electrode H7-1 by being electrically connected to one signal line (SL); and a large-sized electrode (HE) arranged in a seventh electrode row (ER #7) forms a horizontal touch electrode H8-1 by being electrically connected to one signal line (SL)

According to this manner, the total of 32 horizontal touch electrodes (H1-1, H2-1, H3-1, H4-1, ..., H16-1, H1-2, H2-2, H3-2, H4-2, ..., H16-2) are arranged in eight touch sensor groups (TSG #1~TSG #8).

As described above, each of the signal lines (SL) forming the vertical touch electrodes (V1-1, V2-1, ..., V8-1, V1-2, V2-2, ..., V8-2, V1-3, V2-3, ..., V8-3, V1-4, V2-4, ..., V8-4) is electrically connected to the corresponding small-sized electrodes (VE) through one or more contact holes.

Each of the signal lines (SL) forming the horizontal touch electrodes (H1-1, H2-1, H3-1, H4-1, ..., H16-1, H1-2, H2-2, H3-2, H4-2, ..., H16-2) is electrically connected to the corresponding large-sized electrodes (HE) through one or more contact holes.

Each of the signal lines (SL) forming the vertical touch electrodes (V1-1, V2-1, ..., V8-1, V1-2, V2-2, ..., V8-2, V1-3, V2-3, ..., V8-3, V1-4, V2-4, ..., V8-4) and the horizontal touch electrodes (H1-1, H2-1, H3-1, H4-1, . . . , H16-1, H1-2, H2-2, H3-2, H4-2, . . . , H16-2) may be arranged up to corresponding electrode(s) (E) electrically connected from a conductive pad to which the touch driving circuit is connected, or be arranged up to beyond the corresponding electrode(s) (E) electrically connected. Here, the conductive pad may be formed from an array or other arrangement of conductive traces or patches.

One signal line (SL) may overlap with at least one small-sized electrode (VE) or at least one large-sized electrode (HE), and be electrically connected to the at least one overlapped small-sized electrode (VE) or the at least one overlapped large-sized electrode (HE).

Another signal line (SL) may overlap with a plurality of small-sized electrodes (VE) and a plurality of large-sized electrodes (HE), and be electrically connected to either 4(K=4) small-sized electrodes (VE) of the overlapped small-sized overlapped electrodes (VE) or one large-sized electrode (HE) of the overlapped large-sized electrodes (HE)

Referring to FIGS. 10, 11A, 11B and 12, signal lines (SL) forming the horizontal touch electrodes (H1-1, H2-1, H3-1, H4-1) included in the first touch sensor group (TSG #1) are signal lines (SL) electrically connected to large-sized electrodes (HE) included in the first touch sensor group (TSG #1). Signal lines (SL) forming the horizontal touch electrodes (H5-1, H6-1, H7-1, H8-1) included in the second touch sensor group (TSG #2) are signal lines (SL) electrically connected to large-sized electrodes (HE) included in the second touch sensor group (TSG #2). Signal lines (SL) forming the horizontal touch electrodes (H9-1, H10-1, H11-1, H12-1) included in the third touch sensor group (TSG #3) are signal lines (SL) electrically connected to large-sized electrodes (HE) included in the third touch sensor group (TSG #3). Signal lines (SL) forming the horizontal touch electrodes (H13-1, H14-1, H15-1, H16-1) included in the fourth touch sensor group (TSG #4) are signal lines (SL) electrically connected to large-sized electrodes (HE) included in the fourth touch sensor group (TSG #4).

Signal lines (SL) forming the horizontal touch electrodes (H1-2, H2-2, H3-21, H4-2) included in the fifth touch sensor group (TSG #5) are signal lines (SL) electrically connected to large-sized electrodes (HE) included in the fifth touch sensor group (TSG #5). Signal lines (SL) forming the horizontal touch electrodes (H5-2, H6-2, H7-2, H8-2) included in the sixth touch sensor group (TSG #6) are signal lines (SL) electrically connected to large-sized electrodes (HE) included in the sixth touch sensor group (TSG #6). Signal lines (SL) forming the horizontal touch electrodes (H9-2, H10-2, H11-2, H12-2) included in the seventh touch sensor group (TSG #7) are signal lines (SL) electrically connected to large-sized electrodes (HE) included in the seventh touch sensor group (TSG #7). Signal lines (SL) forming the horizontal touch electrodes (H13-2, H14-2, H15-2, H16-2) included in the eighth touch sensor group (TSG #8) are signal lines (SL) electrically connected to large-sized electrodes (HE) included in the eighth touch sensor group (TSG #8).

According to the signal line arrangement and connection structure illustrated in FIG. 11A, the signal lines forming the horizontal touch electrodes included in each of the eight touch sensor groups (TSG #1~TSG #8) may be arranged to be adjacent to one another, and signal lines forming vertical-related touch electrodes may be arranged between the signal lines forming the horizontal touch electrodes included in each of the eight touch sensor groups (TSG #1~TSG #8), such as, (horizontal, horizontal, horizontal, horizontal), (vertical, vertical, vertical, vertical), (horizontal, horizontal, horizontal, horizontal), or the like.

Referring to FIG. 11A, the signal lines (SL) connected to the horizontal touch electrodes included in each of the plurality of touch sensor groups (TSG #1~TSG #8) are arranged to be adjacent to one another. A signal line (SL) connected to a vertical touch electrode included in the first touch sensor group (TSG #1) may be arranged between signal lines (SL) connected to horizontal touch electrodes included in the first touch sensor group (TSG #1) of the plurality of touch sensor groups (TSG #1~TSG #8) and signal lines (SL) connected to horizontal touch electrodes included in the second touch sensor group (TSG #2) of the plurality of touch sensor groups (TSG #1~TSG #8)

Referring to FIG. 11A, the signal lines (SL) forming the horizontal touch electrodes (H1-1, H2-1, H3-1, H4-1) included in the first touch sensor group (TSG #1) may be arranged to be adjacent to one another. The signal lines (SL) forming the horizontal touch electrodes (H5-1, H6-1, H7-1, H8-1) included in the second touch sensor group (TSG #2) may be arranged to be adjacent to one another. The signal lines (SL) forming the horizontal touch electrodes (H9-1, H10-1, H11-1, H12-1) included in the third touch sensor group (TSG #3) may be arranged to be adjacent to one another. The signal lines (SL) forming the horizontal touch electrodes (H13-1, H14-1, H15-1, H16-1) included in the fourth touch sensor group (TSG #4) may be arranged to be adjacent to one another.

Referring to FIG. 11A, vertical-related signal lines may be arranged between the signal lines (SL) forming the horizontal touch electrodes (H1-1, H2-1, H3-1, H4-1) included in the first touch sensor group (TSG #1) and the signal lines (SL) forming the horizontal touch electrodes (H5-1, H6-1, H7-1, H8-1) included in the second touch sensor group (TSG #2). Here, the vertical-related signal lines (SL) may include one or more signal lines (SL) forming all or some of vertical touch electrodes (V1-1) included in the first touch sensor group (TSG #1), a signal line (SL) forming all or some of vertical touch electrodes (V1-2) included in the second touch sensor group (TSG #2), a signal line (SL) forming all or some of vertical touch electrodes (V1-3) included in the third touch sensor group (TSG #3), and a signal line (SL) forming all or some of vertical touch electrodes (V1-4) included in the fourth touch sensor group (TSG #4).

Likewise, vertical-related signal lines (SL) may be arranged between the signal lines (SL) forming the horizontal touch electrodes (H5-1, H6-1, H7-1, H8-1) included in the second touch sensor group (TSG #2) and the signal lines (SL) forming the horizontal touch electrodes (H9-1, H10-1, H11-1, H12-1) included in the third touch sensor group (TSG #3). Here, the vertical-related signal lines (SL) may include one or more signal lines (SL) forming all or some of vertical touch electrodes (V2-1) included in the first touch sensor group (TSG #1), a signal line (SL) forming all or some of vertical touch electrodes (V2-2) included in the second touch sensor group (TSG #2), a signal line (SL) forming all or some of vertical touch electrodes (V2-3) included in the third touch sensor group (TSG #3), and a signal line (SL) forming all or some of vertical touch electrodes (V2-4) included in the fourth touch sensor group (TSG #4).

Likewise, vertical-related signal lines (SL) may be arranged between the signal lines (SL) forming the horizontal touch electrodes (H9-1, H10-1, H11-1, H12-1) included in the third touch sensor group (TSG #3) and the signal lines (SL) forming the horizontal touch electrodes (H13-1, H14-1, H15-1, H16-1) included in the fourth touch sensor group (TSG #4). Here, the vertical-related signal lines (SL) may include one or more signal lines (SL) forming all or some of vertical touch electrodes (V3-1) included in the first touch sensor group (TSG #1), a signal line (SL) forming all or some of vertical touch electrodes (V3-2) included in the second touch sensor group (TSG #2), a signal line (SL) forming all or some of vertical touch electrodes (V3-3) included in the third touch sensor group (TSG #3), and a signal line (SL) forming all or some of vertical touch electrodes (V3-4) included in the fourth touch sensor group (TSG #4).

According to a signal line arrangement and connection structure illustrated in FIG. 11B, a horizontal-related signal line (SL) connected to horizontal touch electrodes may be arranged to be alternated with a vertical-related signal line (SL) connected to vertical touch electrodes, such as, (horizontal, vertical, horizontal, vertical, . . . ). Here, the horizontal-related signal line (SL) is one of signal lines (SL) forming horizontal touch electrodes (H1-1, H2-1, H3-1, H4-1, . . . , H16-1, H1-2, H2-2, H3-2, H4-2, . . . , H16-2). Here, the vertical-related signal line (SL) is one of signal lines (SL) forming vertical touch electrodes (V1-1, V2-1, . . . , V8-1, V1-2, V2-2, . . . , V8-2, V1-3, V2-3, . . . , V8-3, V1-4, V2-4, . . . , V8-4).

Referring to FIG. 11B, a signal line (SL) forming the first horizontal touch electrode (H1-1) of the first touch sensor group (TSG #1) and a signal line (SL) forming the first vertical touch electrode (V1-1) of the first touch sensor group (TSG #1) are arranged. Next, a signal line (SL) forming the first horizontal touch electrode (H5-1) of the second touch sensor group (TSG #2) and a signal line (SL) forming the first vertical touch electrode (V1-2) of the second touch sensor group (TSG #2) are arranged. Next, a signal line (SL) forming the first horizontal touch electrode (H9-1) of the third touch sensor group (TSG #3) and a signal line (SL) forming the first vertical touch electrode (V1-3) of the third touch sensor group (TSG #3) are arranged. Then, a signal line (SL) forming the first horizontal touch electrode (H13-1) of the fourth touch sensor group (TSG #4) and a signal line (SL) forming the first vertical touch electrode (V1-4) of the fourth touch sensor group (TSG #4) are arranged.

Referring to FIGS. 11A and 11B, signal lines (SL) may include one or more signal lines (SL) overlapping one or more small-sized electrodes (VE) and one or more large-sized electrode (HE). Referring to FIG. 11A, the signal lines (SL) may include a signal line (SL, 1100) overlapping one or more large-sized electrode (HE) and not overlapping one or more small-sized electrodes (VE), and this signal line (SL, 1100) may be a signal line (SL) electrically connected to one or more large-sized electrode(s).

Figure 13A:
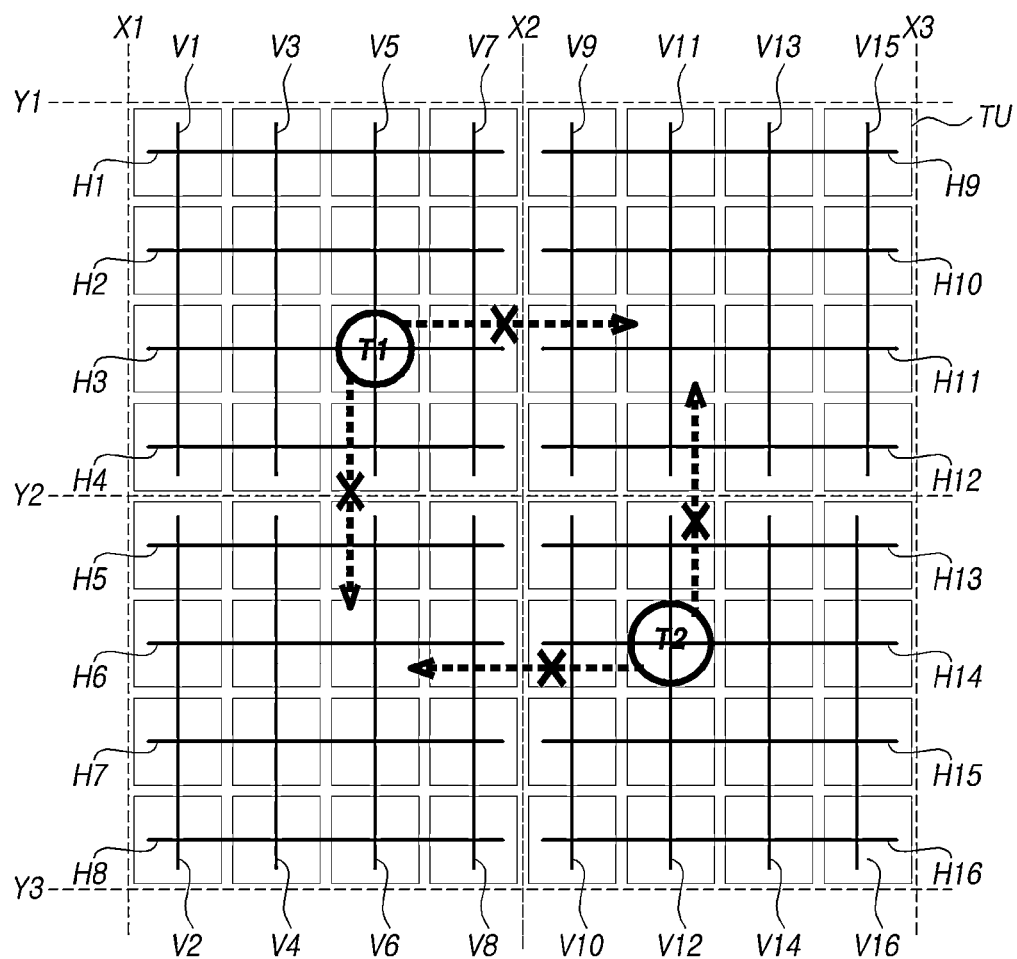
FIG. 13A is a diagram illustrating a situation where multiple touches occur in two touch sensor groups within the hybrid-type touch panel according to embodiments of the present disclosure.

FIG. 13A is a diagram illustrating a situation where ghost occur distributedly in two touch sensor groups (TSG #1, TSG #4) in the hybrid-type touch panel TSP according to embodiments of the present disclosure.

Referring to FIG. 13A, in combination with FIG. 7, horizontal touch electrodes (H1, H2, H3, H4) arranged in an area of the first touch sensor group TSG #1 in which a first touch T1 has occurred are disconnected to horizontal touch electrodes (H9, H10, H11, H12) arranged in an area of the third touch sensor group TSG #3 in proximity thereto.

Vertical touch electrodes (V1, V3, V5, V7) arranged in the area of the first touch sensor group TSG #1 in which the first touch T1 has occurred are disconnected to vertical touch electrodes (V2, V4, V6, V8) arranged in an area of the second touch sensor group TSG #2 in proximity thereto.

Referring to FIG. 13A, in combination with FIG. 7, horizontal touch electrodes (H13, H14, H15, H16) arranged in an area of the fourth touch sensor group TSG #4 in which a second touch T2 has occurred are disconnected to horizontal touch electrodes (H5, H6, H7, H8) arranged in an area of the second touch sensor group TSG #2 in proximity thereto.

Vertical touch electrodes (V10, V12, V14, V16) arranged in the area of the fourth touch sensor group TSG #4 in which the second touch T2 has occurred are disconnected to vertical touch electrodes (V9, V11, V13, V15) arranged in an area of the third touch sensor group TSG #3 in proximity thereto.

Accordingly, charges resulted from the first touch T1 occurred in the area of the first touch sensor group TSG #1 cannot be transferred to the second, third, and fourth touch sensor groups TSG #2, TSG #3, TSG #4 in proximity to the first touch sensor group TSG #1.

Further, charges resulted from the second touch T2 occurred in the area of the fourth touch sensor group TSG #4 cannot be transferred to the first, second, and third touch sensor groups TSG #1, TSG #2, TSG #3 in proximity to the fourth touch sensor group TSG #4.

Thus, when multiple touches (T1, T2) occur distributedly in two touch sensor groups (TSG #1, TSG #4), it is possible to overcome the ghost phenomenon, that is when one or more pseudo touch points were recognized due to the multiple touches. Multiple touches (T1, T2) are said to occur distributedly when each touch of the multiple touches is in a different touch sensor group (TSG #1, TSG #4).

Figure 13B:
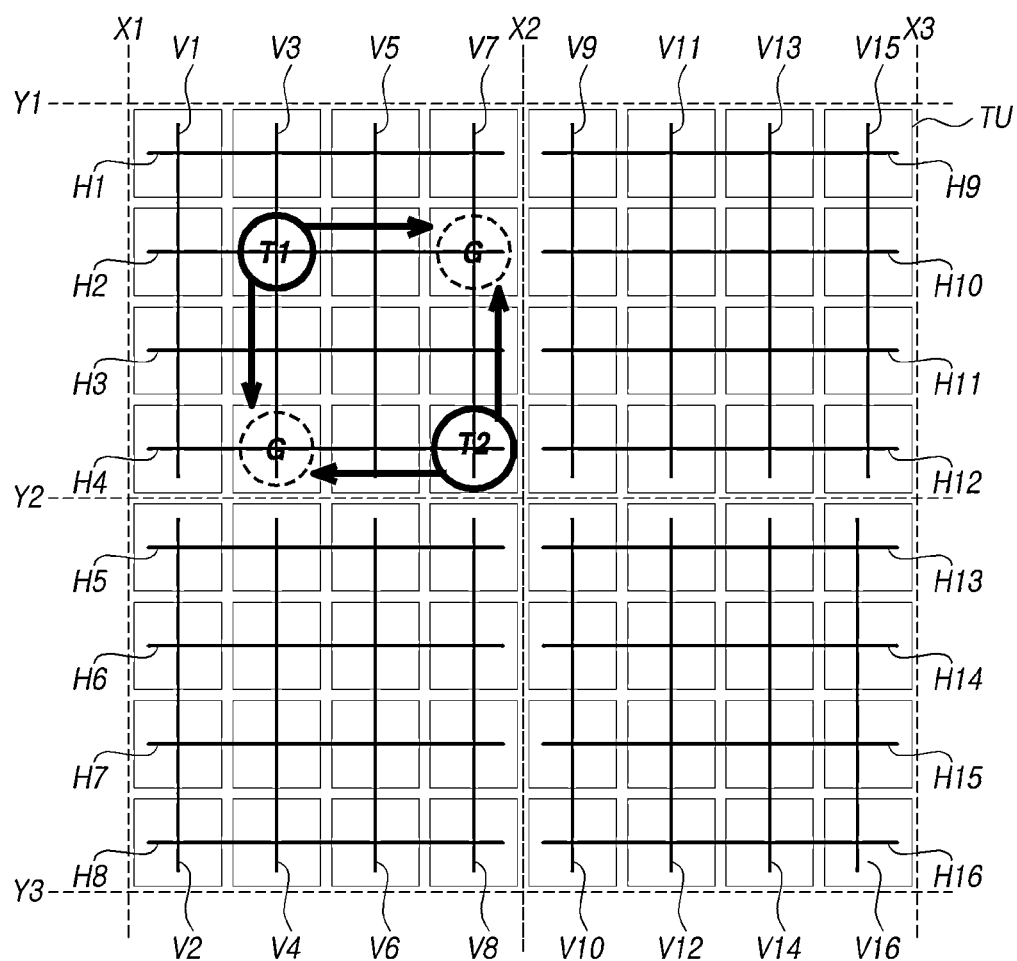
FIG. 13B is a diagram illustrating a situation where all touches of the multiple touches occur in one touch sensor group within the hybrid-type touch panel according to embodiments of the present disclosure.

FIG. 13B is a diagram illustrating a situation where all touches of the multiple touches (T1, T2) occur in one touch sensor group TSG #1 in the hybrid-type touch panel TSP according to embodiments of the present disclosure.

Referring to FIG. 13B, horizontal touch electrodes (H1, H2, H3, H4) and vertical touch electrodes (V1, V3, V5, V7) arranged in an area of the first touch sensor group TSG #1 in which both a first touch T1 and a second touch T2 have occurred are formed in the form of intersecting one another.

Accordingly, charges resulted from the first touch T1 and the second touch T2 are transferred through the horizontal touch electrodes (H2, H4) and through the vertical touch electrodes (V3, V7) in the area of the first touch sensor group TSG #1; thus, pseudo touch points (G, false touch points caused by the aforementioned ghost phenomenon as described in reference to FIG. 5) may be recognized at two points.

That is, when two or more of the multiple touches (T1, T2) have occurred in one and the same touch sensor group TSG #1, there is a possibility of occurrence of the ghost phenomenon i.e. one or more pseudo touch points G are recognized.

Figure 14A:
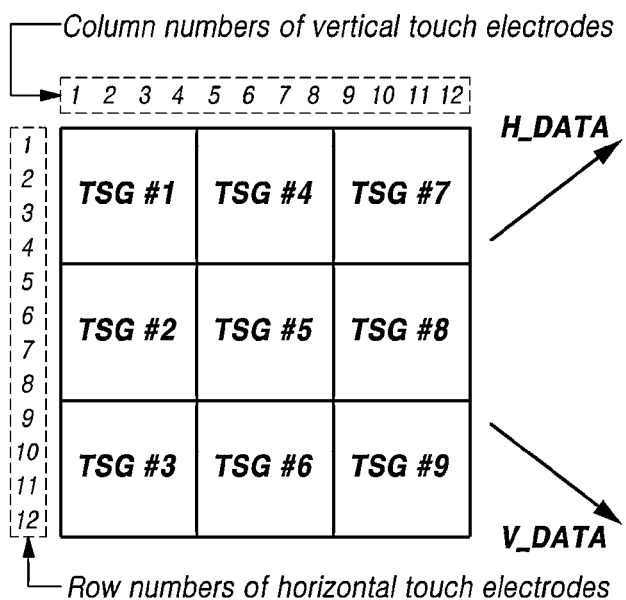
FIGS. 14A and 14B are other diagrams illustrating a touch sensing method of preventing or overcoming a ghost by using a data comparison technique when multiple touches occur in the touch display device according to embodiments of the present disclosure.
Figure 14B:
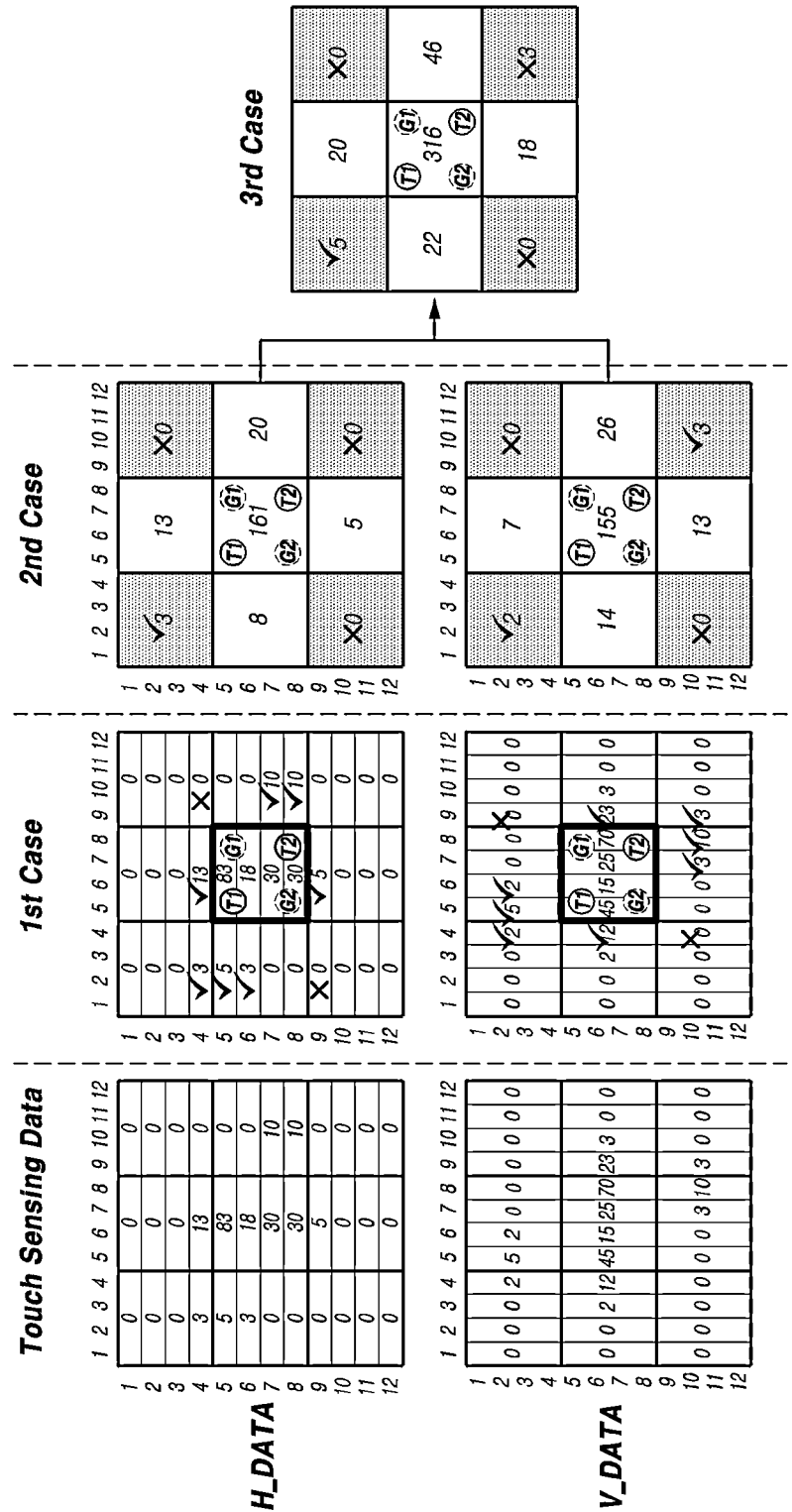

FIGS. 14A and 14B are other diagrams illustrating a touch sensing method of preventing or overcoming a ghost by using a data comparison technique when multiple touches occur in the touch display device according to embodiments of the present disclosure.

Referring to FIG. 14A, for example, it is assumed that nine touch sensor groups (TSG #1~TSG #9) are present. By the electrode arrangement structure, and the signal line arrangement and connection structure described above, it is assumed that four horizontal touch electrodes and four vertical touch electrodes are arranged in each of nine touch sensor groups (TSG #1~TSG #9)

In FIG. 14A, numbers located on the top of the nine touch sensor groups (TSG #1~TSG #9) represent 12 columns in which 36(=9*4) vertical touch electrodes are arranged, and numbers located on the left side of the nine touch sensor groups (TSG #1~TSG #9) represent 12 rows in which 36(=9*4) horizontal touch electrodes are arranged.

According to a self-capacitance sensing scheme, the touch driving circuit (TDC) can perform sensing for all of the 36(=9*4) horizontal touch electrodes and the 36(=9*4) vertical touch electrodes included in the nine touch sensor groups (TSG #1~TSG #9), obtain sensing values for each of the 36(=9*4) horizontal touch electrodes and sensing values for each of the 36(=9*4) vertical touch electrodes based on results from the sensing, generate touch sensing data including the obtained sensing value, and then supply the generated data to the touch controller (TCTR).

Referring to FIG. 14A, the touch sensing data generated by the touch driving circuit (TDC) include horizontal touch sensing data (H_DATA) including touch sensing values for horizontal touch electrodes and vertical touch sensing data (V_DATA) including touch sensing values for vertical touch electrodes.

Referring to FIG. 14A, for example, sensing values for horizontal touch electrodes may include sensing values (0, 0, 0, 3) for four horizontal touch electrodes included in a first touch sensor group (TSG #1), sensing values (5, 3, 0, 0) for four horizontal touch electrodes included in a second touch sensor group (TSG #2), sensing values (0, 0, 0, 0) for four horizontal touch electrodes included in a third touch sensor group (TSG #3), sensing values (0, 0, 0, 13) for four horizontal touch electrodes included in a fourth touch sensor group (TSG #4), sensing values (83, 18, 30, 30) for four horizontal touch electrodes included in a fifth touch sensor group (TSG #5), sensing values (5, 0, 0, 0) for four horizontal touch electrodes included in a sixth touch sensor group (TSG #6), sensing values (0, 0, 0, 0) for four horizontal touch electrodes included in a seventh touch sensor group (TSG #7), sensing values (0, 0, 10, 10) for four horizontal touch electrodes included in an eighth touch sensor group (TSG #8), and sensing values (0, 0, 0, 0) for four horizontal touch electrodes included in a ninth touch sensor group (TSG #9).

Referring to FIG. 14A, for example, sensing values for vertical touch electrodes may include sensing values (0, 0, 0, 2) for four vertical touch electrodes included in the first touch sensor group (TSG #1), sensing values (0, 0, 2, 12) for four vertical touch electrodes included in the second touch sensor group (TSG #2), sensing values (0, 0, 0, 0) for four vertical touch electrodes included in the third touch sensor group (TSG #3), sensing values (5, 2, 0, 0) for four vertical touch electrodes included in the fourth touch sensor group (TSG #4), sensing values (45, 15, 25, 70) for four vertical touch electrodes included in the fifth touch sensor group (TSG #5), sensing values (0, 0, 3, 10) for four vertical touch electrodes included in the sixth touch sensor group (TSG #6), sensing values (0, 0, 0, 0) for four vertical touch electrodes included in the seventh touch sensor group (TSG #7), sensing values (23, 3, 0, 0) for four vertical touch electrodes included in the eighth touch sensor group (TSG #8), and sensing values (3, 0, 0, 0) for four vertical touch electrodes included in the ninth touch sensor group (TSG #9).

Referring to FIG. 14B, when all multiple touches (T1, T2) occur in an area of a fifth touch sensor group (TSG #5), ghosts (G1, G2) may occur, which are fake touches that are mistaken as a point touched by the user. When such ghosts (G1, G2) are removed or overcome, it is possible to perform substantially accurately touch sensing for the multiple touches (T1, T2).

In FIG. 14B, circles labeled with a first touch (T1), a second touch (T2), a first ghost (G1), and a second ghost (G2) are estimated touch points that can be recognized from touch sensing data (H_DATA, V_DATA) when a technique for overcoming or removing ghosts is not applied, and may correspond to four touch units of 16 touch units included in the fifth touch sensor group (TSG #5).

Referring to FIG. 14B, in accordance with embodiments of the present disclosure, the ghost remove technique based on touch sensing data is provided to remove or overcome the ghost when all multiple touches (T1 and T2) occur within an identical touch sensor group, such as the fifth touch sensor group (TSG #5). That is, the touch controller (TCTR) of the touch display device may obtain touch sensing data on each of the nine touch sensor groups (TSG #1~TSG #9) from touch sensing data supplied by the touch driving circuit (TDC), and remove or prevent a ghost based on the touch sensing data on each of the nine touch sensor groups (TSG #1~TSG #9).

The touch display device in accordance with embodiments of the present disclosure provides three cases (a 1st case, a 2nd case, a 3rd case) as a ghost remove technique based on touch sensing data.

First, discussions are conducted on a procedure applied to all of the three cases (the 1st case, the 2nd case, the 3rd case).

The touch controller (TCTR) can calculate sensing values on 16 touch points (corresponding to 16 touch units (TU)) in which horizontal touch electrodes and vertical touch electrodes intersect each other based on sensing values on the horizontal touch electrodes in each of nine touch sensor groups (TSG #1~TSG #9) included in horizontal touch sensing data (H_DATA) and sensing values on the vertical touch electrodes in each of the ninth touch sensor groups (TSG #1~TSG #9) included in vertical touch sensing data (V_DATA).

The touch controller (TCTR) can derive touch points with sensing values greater than or equal to a pre-configured threshold value from the sensing values calculated for the 16 touch points (corresponding to 16 touch units (TU)). As assumed above, when all of the multiple touches (T1, T2) occur within the area of the fifth touch sensor group (TSG #5), the derived touch points correspond to four estimated touch points (four circles) in the fifth touch sensor group (TSG #5).

Hereinafter, the 1st case for removing a ghost based on touch sensing data will be described, which is performed after the above common procedure.

Based on horizontal touch sensing data (H_DATA), the touch controller (TCTR) obtains either the entire sensing values (3, 5, 3, 13, 0, 0, 0, 10, 10, 0, 5, 0, 0, 0) of horizontal touch electrodes located in the boundary area, or some sensing values (sensing values of horizontal touch electrodes located in corner areas), of the fifth touch sensor group (TSG #5) in which four estimated touch points (T1, T2, G1, G2) are included.

Based on vertical touch sensing data (V_DATA), the touch controller (TCTR) obtains either the entire sensing values (12, 2, 5, 2, 0, 0, 0, 23, 3, 10, 3, 0, 0, 0) of vertical touch electrodes located in the boundary area, or some sensing values (sensing values of vertical touch electrodes located in corner areas), of the fifth touch sensor group (TSG #5) in which the four estimated touch points (T1, T2, G1, G2) are included.

The touch controller (TCTR) derives 0 (zero) or a setting value corresponding to 0 (zero) as an invalid sensing value from the obtained sensing values of horizontal touch electrodes and vertical touch electrodes located in the boundary area of the fifth touch sensor group (TSG #5) and removes, as the ghost, touch coordinate points (G1, G2) adjacent to the derived invalid sensing value from the four estimated touch points (T1, T2, G1, G2).

Next, the 2nd case for removing a ghost based on touch sensing data will be described.

Based on horizontal touch sensing data (H_DATA), the touch controller (TCTR) adds all sensing values of horizontal touch electrodes included in each of touch sensor groups (TSG #1, TSG #7, TSG #9, TSG #3) located in corner areas of the four estimated touch points (T1, T2, G1, G2) among touch sensor groups (TSG #1, TSG #4, TSG #7, TSG #8, TSG #9, TSG #6, TSG #3, TSG #2) adjacent to the fifth touch sensor group (TSG #5) in which the four estimated touch points (T1, T2, G1, G2) are included. Horizontal adding values obtained by the adding are 3, 0, 0, 0.

Based on vertical touch sensing data (V_DATA), the touch controller (TCTR) adds all sensing values of vertical touch electrodes included in each of touch sensor groups (TSG #1, TSG #7, TSG #9, TSG #3) located in corner areas of the four estimated touch points (T1, T2, G1, G2) among touch sensor groups (TSG #1, TSG #4, TSG #7, TSG #8, TSG #9, TSG #6, TSG #3, TSG #2) adjacent to the fifth touch sensor group (TSG #5) in which the four estimated touch points (T1, T2, G1, G2) are included. Vertical adding values obtained by the adding are 2, 0, 3, 0.

For each of the touch sensor groups (TSG #1, TSG #7, TSG #9, TSG #3) located in the corner areas of the four estimated touch points (T1, T2, G1, G2), based on the horizontal adding values (3, 0, 0, 0) obtained by adding the sensing values of the horizontal touch electrodes and the vertical adding values (2, 0, 3, 0) obtained by adding the sensing values of the vertical touch electrodes, the touch controller (TCTR) selects touch sensor groups (TSG #7, TSG #3) in which the horizontal adding values and the vertical adding values become commonly 0 (Zero) or a setting value corresponding to 0 (zero), and removes, as the ghost, touch coordinate points (G1, G2) adjacent to the selected touch sensor groups (TSG #7, TSG #3) from the four estimated touch points (T1, T2, G1, G2).

Next, the 3rd case for removing a ghost based on touch sensing data will be described.

Based on horizontal touch sensing data (H_DATA) and the vertical touch sensing data (V_DATA), the touch controller (TCTR) adds all of both sensing values of horizontal touch electrodes and sensing values of vertical touch electrodes which are included in each of the touch sensor groups (TSG #1, TSG #7, TSG #9, TSG #3) located in the corner areas of the four estimated touch points (T1, T2, G1, G2) among the touch sensor groups (TSG #1, TSG #4, TSG #7, TSG #8, TSG #9, TSG #6, TSG #3, TSG #2) adjacent to the fifth touch sensor group (TSG #5) in which the four estimated touch points (T1, T2, G1, G2) are included. Horizontal and vertical adding values obtained by the adding are 5, 0, 3, 0.

For each of the touch sensor groups (TSG #1, TSG #7, TSG #9, TSG #3) located in the corner areas of the four estimated touch points (T1, T2, G1, G2), based on group adding values (5, 0, 3, 0) obtained by the adding of all of both the sensing values of horizontal touch electrodes and the sensing values of vertical touch electrodes, the touch controller (TCTR) selects touch sensor groups (TSG #7, TSG #3) in which the group adding values (5, 0, 3, 0) become commonly 0 (Zero) or a setting value corresponding to 0 (zero), and removes, as the ghost, touch coordinate points (G1, G2) adjacent to the selected touch sensor groups (TSG #7, TSG #3) from the four estimated touch points (T1, T2, G1, G2).

According to the above described three cases, the touch controller (TCTR) removes, as invalid sensing values, calculated sensing values for the estimated touch points (G1, G2) recognized as ghosts from sensing values calculated from the four estimated touch points (T1, T2, G1, G2), and then calculates touch coordinates using the remaining sensing values. Therefore, it is possible to calculate touch coordinates more accurately for multiple touches (T1, T2).

Even when sensing multiple touches in a self-capacitance based touch sensing manner, it is possible to remove a ghost effectively by using the method of removing the ghost based on touch sensing data described above.

Figure 15:
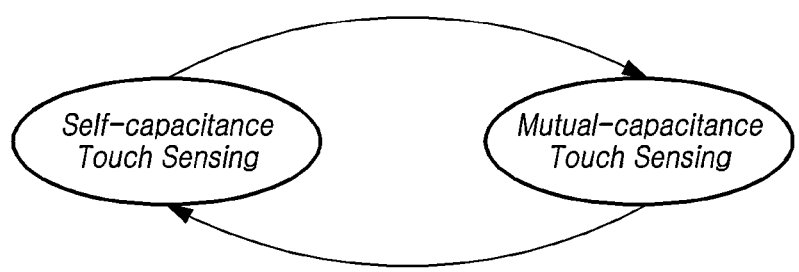
FIG. 15 is a diagram illustrating two sensing schemes available to perform using the hybrid-type touch panel in touch display device according to embodiments of the present disclosure.

FIG. 15 is a diagram illustrating two sensing schemes available to perform touch sensing in the hybrid-type touch panel TSP, in accordance with the present technique, of a touch display device.

Referring to FIG. 15, touch display device in accordance with embodiments of the present disclosure can provide two sensing schemes when the hybrid-type touch panel TSP of the present technique is used.

The two sensing schemes includes a first sensing scheme and a second sensing scheme. The first sensing scheme is a self-capacitance touch sensing scheme and may simply be referred to as a self sensing scheme.

The second sensing scheme is a mutual-capacitance touch sensing scheme and may simply be referred to as a mutual sensing scheme.

First, a sensing scheme for a single touch (one touch) will be described.

When a single touch is performed, the touch display device in accordance with embodiments of the present disclosure can perform sensing using the self sensing scheme.

Thus, when the single touch has occurred in an area of one of the four touch sensor groups (TSG #1, TSG #2, TSG #3, TSG #4), the touch driving circuit TDC can drive a plurality of electrodes E included in one touch sensor group, and sense sequentially one by one, or two or more at a time, the plurality of electrodes E included in the one touch sensor group.

Alternatively, when the single touch is performed, the touch display device of the present technique can perform sensing using the mutual sensing scheme as well.

Thus, when the single touch has occurred in the area of one of the four touch sensor groups (TSG #1, TSG #2, TSG #3, TSG #4), in order to perform mutual-capacitance based touch sensing i.e. the mutual sensing, the touch driving circuit TDC can apply a touch driving signal to one or more electrodes of the plurality of electrodes E included in one touch sensor group in which the single touch has occurred, and receive a touch sensing signal from one or more electrodes to which the touch driving signal is not applied. The one or more electrodes to which the touch driving signal is applied by the touch driving circuit TDC become the driving electrode(s), and the one or more electrodes from which the touch sensing signal is received by the touch driving circuit TDC become the sensing electrode(s).

As an example, the driving electrodes may be electrodes VE included in odd-numbered electrode rows (ER #1, ER #3, ER #5, ER #7, . . . ) in the area of each of the four touch sensor groups (TSG #1, TSG #2, TSG #3, TSG #4). The sensing electrodes may be electrodes HE included in even-numbered electrode rows (ER #2, ER #4, ER #6, ER #8, . . . ) in the area of each of the four touch sensor groups (TSG #1, TSG #2, TSG #3, TSG #4).

As another example, the driving electrodes may be electrodes HE included in even-numbered electrode rows (ER #2, ER #4, ER #6, ER #8, . . . ) in the area of each of the four touch sensor groups (TSG #1, TSG #2, TSG #3, TSG #4). The sensing electrodes may be electrodes VE included in odd-numbered electrode rows (ER #1, ER #3, ER #5, ER #7, . . . ) in the area of each of the four touch sensor groups (TSG #1, TSG #2, TSG #3, TSG #4).

Next, a sensing scheme for a multi-touch (at least two touches, that is, multiple touches) will be described.

First, description will be given for a method of recognizing a single touch and a multi-touch and distinguishing between them.

For example, touch driving circuit (TDC) drives touch electrodes (V1~V16, H1~H16) of the touch panel (TSP), generates touch sensing data including a sensing value of each of the touch electrodes (V1~V16, H1~H16) based on touch sensing signals detected through the touch electrodes (V1~V16, H1~H16), and supplies the generated touch sensing data to the touch controller (TCTR).

By using a sensing value of each of the touch electrodes (V1~V16, H1~H16) included in the supplied touch sensing data, the touch controller (TCTR) can determine whether a single touch has occurred or multiple touches have occurred, and determine touch coordinates of the single touch or the multiple touches. For example, the touch controller (TCTR) can identify clusters (groups of distributions) for sensing values above a threshold value based on a distributed location of a sensing value of each of touch electrodes (V1~V16, H1~H16) included in touch sensing data, and, by analyzing whether the number of clusters distinguished from one another is one or above two, determine that a single touch has occurred when the number of clusters is one, and that multiple touches have occurred when the number of clusters is above two.

When multiple touches (at least two touches) are performed, the touch display device can sense the touch panel TSP by determining one of the self sensing scheme and the mutual sensing scheme based on the locations of the touches of the multiple touches.

When the multiple touches have occurred distributedly in at least two of the four touch sensor groups (TSG #1, TSG #2, TSG #3, TSG #4), since the ghost phenomenon is not caused, the touch display device can therefore select the self sensing scheme, and sense the touch panel TSP using the self sensing scheme.

Thus, when the multiple touches have occurred distributedly in the first touch sensor group TSG #1 and the second touch sensor group TSG #2 of the four touch sensor groups (TSG #1, TSG #2, TSG #3, TSG #4), the touch driving circuit TDC can drive a plurality of electrodes E included in the first touch sensor group TSG #1 and the second touch sensor group TSG #2, and sense sequentially one by one, or two or more at a time, the plurality of electrodes E included in the first touch sensor group TSG #1 and the second touch sensor group TSG #2.

When the multiple touches have occurred in one of the four touch sensor groups (TSG #1, TSG #2, TSG #3, TSG #4), since there is a possibility that the ghost phenomenon is caused, in order to overcome the ghost phenomenon, the touch display device can therefore select the mutual sensing scheme, and sense the touch panel TSP using the mutual sensing scheme.

Thus, when all touches of the multiple touches have occurred in the area of one of the four touch sensor groups (TSG #1, TSG #2, TSG #3, TSG #4), the touch driving circuit TDC drives, as driving electrodes, one or more of a plurality of electrodes E included in one touch sensor group in which the multiple touches have occurred, and senses the one or more remaining electrodes in the one touch sensor group as sensing electrodes.

In other words, when all touches of the multiple touches have occurred in the area of one of the four touch sensor groups (TSG #1, TSG #2, TSG #3, TSG #4), the touch driving circuit TDC can apply a touch driving signal to one or more driving electrodes of the plurality of electrodes E included in one touch sensor group in which the multiple touches have occurred, and receive a touch sensing signal from one or more sensing electrodes to which the touch driving signal is not applied.

Here, the driving electrodes may be electrodes VE included in odd-numbered electrode rows (ER #1, ER #3, ER #5, ER #7, . . . ) in the area of each of the four touch sensor groups (TSG #1, TSG #2, TSG #3, TSG #4). The sensing electrodes may be electrodes HE included in even-numbered electrode rows (ER #2, ER #4, ER #6, ER #8, . . . ) in the area of each of the four touch sensor groups (TSG #1, TSG #2, TSG #3, TSG #4).

Alternatively, the driving electrodes may be electrodes HE included in even-numbered electrode rows (ER #2, ER #4, ER #6, ER #8, . . . ) in the area of each of the four touch sensor groups (TSG #1, TSG #2, TSG #3, TSG #4). The sensing electrodes may be electrodes VE included in odd-numbered electrode rows (ER #1, ER #3, ER #5, ER #7, . . . ) in the area of each of the four touch sensor groups (TSG #1, TSG #2, TSG #3, TSG #4).

Figure 17:
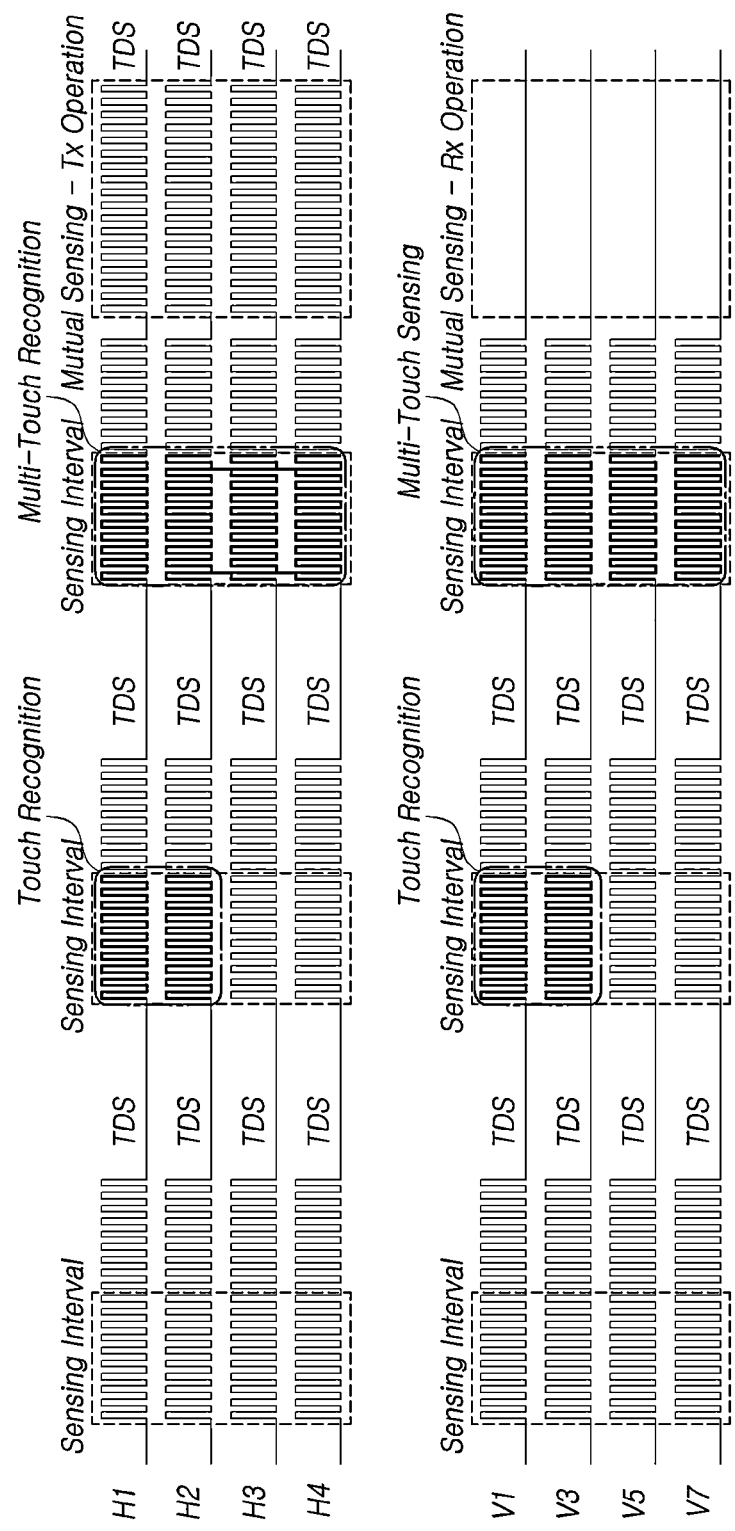

FIGS. 16 and 17 are other diagrams illustrating a touch sensing method of preventing or overcoming a ghost by using a sensing scheme changing technique when multiple touches occur in the touch display device according to embodiments of the present disclosure.

Referring to FIG. 16, the touch display device senses the touch panel TSP in a situation where a touch event does not occur (t=t1). Thereafter, at time t=t2, a first touch T1 occurs as a single touch event in the area of the first touch sensor group TSG #1 including 8 electrode rows (ER #1~ER #8) of the four touch sensor groups (TSG #1, TSG #2, TSG #3, TSG #4). At time t=t3, the first touch T1 and a second touch T2 occur as a multi-touch event.

Electrodes VE arranged in an identical column among 16 electrodes VE arranged in odd-numbered electrode rows (ER #1, ER #3, ER #5, ER #7) in the 8 electrode rows (ER #1~ER #8) included in the first touch sensor group TSG #1 are connected to a signal line SL.

Accordingly, 4 vertical touch electrodes (V1, V3, V5, V7) electrically separated from one another in the touch panel TSP are formed by 16 electrodes VE arranged in odd-numbered electrode rows (ER #1, ER #3, ER #5, ER #7) in the 8 electrode rows (ER #1~ER #8) included in the first touch sensor group TSG #1.

Further, one electrode HE arranged in each of even-numbered electrode rows (ER #2, ER #4, ER #6, ER #8) in 8 electrode rows (ER #1~ER #8) included in the first touch sensor group TSG #1 corresponds to one respective horizontal touch electrode (H1, H2, H3, or H4).

That is, 4 electrodes HE arranged in even-numbered electrode rows (ER #2, ER #4, ER #6, ER #8) in 8 electrode rows (ER #1~ER #8) included in the first touch sensor group TSG #1 form 4 horizontal touch electrodes (H1, H2, H3, and H4).

Referring to FIG. 17, at time t=t1, the touch driving circuit TDC can supply a touch driving signal TDS, using the self sensing scheme, to all of 4 vertical touch electrodes (V1, V3, V5, V7) and 4 horizontal touch electrodes (H1, H2, H3, H4), and sense sequentially, simultaneously or substantially simultaneously.

During the sensing, at time t=t2, according to the self sensing scheme, a first touch T1 which forms a single touch event is detected.

Thereafter, at time t=t3, the first touch T1 and a second touch T2 which form a multi-touch event are detected in an area of one touch sensor group TSG #1. Using the mutual sensing scheme, the touch driving circuit TDC drives (performs Tx operation), as one or more driving electrodes, either one or more of 4 vertical touch electrodes (V1, V3, V5, V7) or one or more of the 4 horizontal touch electrodes (H1, H2, H3, H4), and senses (performs Rx operation) one or more remaining touch electrodes as one or more sensing electrodes. To explain further in each TSG, in one example the touch driving circuit TDC drives the 4 vertical touch electrodes (V1, V3, V5, V7) as driving electrodes i.e. uses the 4 vertical touch electrodes (V1, V3, V5, V7) to perform Tx operation, and uses the 4 horizontal touch electrodes (H1, H2, H3, H4) as sensing electrodes i.e. to perform Rx operation. Alternatively, the touch driving circuit TDC may drive the 4 horizontal touch electrodes (H1, H2, H3, H4) as driving electrodes i.e. uses the 4 horizontal touch electrodes (H1, H2, H3, H4) to perform Tx operation, and uses the 4 vertical touch electrodes (V1, V3, V5, V7) as sensing electrodes i.e. to perform Rx operation.

According to the embodiment of FIG. 17, using the mutual sensing scheme, the touch driving circuit TDC drives (performs Tx operation) 4 horizontal touch electrodes (H1, H2, H3, H4) as the driving electrodes, and senses (performs Rx operation) 4 vertical touch electrodes (V1, V3, V5, V7) as the sensing electrodes.

Accordingly, when a touch driving signal TDS is applied to 4 horizontal touch electrodes (H1, H2, H3, H4), the touch driving signal TDS are not applied to 4 vertical touch electrodes (V1, V3, V5, V7).

Thus, even when both the first and second touches which form the multi-touch event occur in the area of one touch sensor group TSG #1, since sensing is performed using the mutual sensing scheme transitioned from the self sensing scheme, it therefore is possible to sense accurately a touch without the ghost phenomenon.

Meanwhile, driving (touch driving) performed using touch sensing methods described above can be performed in a time interval separated in time from display driving for displaying images. In this situation, a common voltage needed for display driving can be applied to touch electrodes (e.g., V1~V16, H1~H16) during a display driving period, and a touch driving signal can be applied to one or more of touch electrodes (e.g., V1~V16, H1 H16) during a touch driving period. Meanwhile, during the touch driving period, when the touch driving signal is applied to one or more of touch electrodes (e.g., V1~V16, H1~H16), the touch driving signal or a signal corresponding in at least one of a frequency, phase, amplitude, and the like to the touch driving signal can be applied to all or part of the remaining touch electrodes.

Meanwhile, driving (touch driving) performed using touch sensing methods described above can be performed simultaneously or substantially simultaneously with the display driving for displaying images. In this situation, the display driving signal applied to the touch electrodes (e.g., V1~V16, H1~H16) can serve as, as well as a driving signal for touch sensing, a common voltage needed for display driving.

Thus, when the display driving and the touch driving are simultaneously or substantially simultaneously performed, signals supplied to electrodes or signal lines related to the display driving can be modulated to correspond to a touch driving signal with a variable voltage level. For example, a data signal supplied to data lines related to the display driving may be modulated to correspond to a touch driving signal with a variable voltage level. Accordingly, at a timing at which a voltage level of the touch driving signal is changed, a voltage level of the data signal can be changed by a variation in the voltage level of the touch driving signal. Further, a gate signal (a scan signal) supplied to gate lines related to the display driving may be modulated to correspond to a touch driving signal with a variable voltage level. Accordingly, at a timing at which a voltage level of the touch driving signal is changed, a voltage level of the gate signal can also be changed by a variation in the voltage level of the touch driving signal.

Meanwhile, when the display driving and the touch driving are performed simultaneously or substantially simultaneously, a ground voltage applied to the display panel DISP may be a modulated signal corresponding to the touch driving signal. Thus, by swing a ground voltage of the display panel DISP, signals and voltages applied to all electrodes and signal lines arranged in the display panel DISP can swing to correspond to a touch driving signal.

Further, when the display driving and the touch driving are performed simultaneously or substantially simultaneously, a data signal applied to data lines is an analogue signal converted from digital image data based on a gamma reference voltage, and since the gamma reference voltage becomes in the form of a signal swinging between voltage levels corresponding to the touch driving signal, the data signal supplied to data lines can therefore swing between voltage levels to correspond to the touch driving signal.

Figure 18:
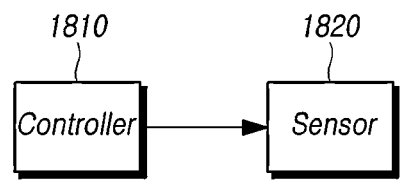
FIG. 18 is a block diagram schematically illustrating a touch sensing circuit according to embodiments of the present disclosure.

FIG. 18 is a block diagram schematically illustrating the touch sensing circuit TSC according to embodiments of the present disclosure.

Referring to FIG. 18, the touch sensing circuit TSC in accordance with embodiments of the present disclosure can include a controller 1810 selecting one of a first sensing scheme and a second sensing scheme according to the locations of multiple touches when the multiple touches occur in touch panel TSP including the 4 touch sensor groups (TSG #1, TSG #2, TSG #3, TSG #4), and a sensor 1820 sensing the touch panel TSP based on the selected sensing scheme.

The controller 1810 can select the first sensing scheme as a scheme for sensing when the multiple touches have occurred distributedly in areas of at least two of the 4 touch sensor groups (TSG #1, TSG #2, TSG #3, TSG #4).

The controller 1810 can select the second sensing scheme as a scheme for sensing when all of the multiple touches have occurred in an area of one of the 4 touch sensor groups (TSG #1, TSG #2, TSG #3, TSG #4).

The first sensing scheme of the two sensing schemes may be the self sensing scheme for sensing a self-capacitance formed in electrodes E arranged in two or more touch sensor groups.

The second sensing scheme of the two sensing schemes may be the mutual sensing scheme for sensing a mutual-capacitance formed between electrodes E arranged in one touch sensor group.

In the touch sensing circuit TSC, the controller 1810 can be the touch controller TCTR, and the sensor 1820 can be the touch driving circuit TDC.

Figure 19:
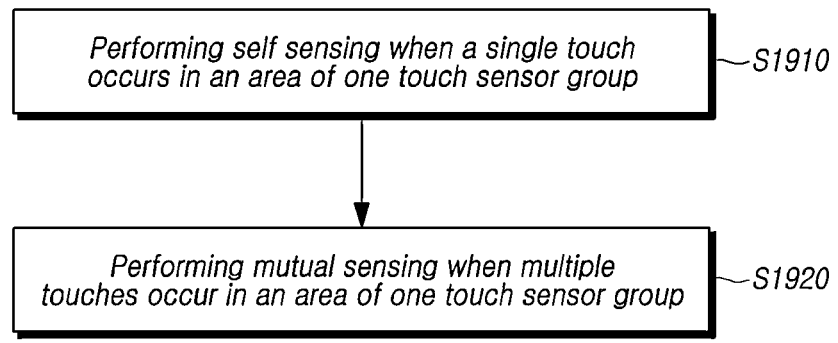
FIG. 19 is a flow diagram illustrating the touch sensing method according to embodiments of the present disclosure.

FIG. 19 is a flow diagram illustrating the touch sensing method according to embodiments of the present disclosure.

Referring to FIG. 19, the touch sensing method in accordance with embodiments of the present disclosure can include performing self sensing for sensing the touch panel TSP using the self-capacitance touch sensing scheme when a single touch occurs, at step S1910, and performing mutual sensing for sensing the touch panel TSP using the mutual-capacitance touch sensing scheme when multiple touches occur, at step S1920.

In the step S1910 of performing self sensing, when a single touch occurs in an area of one of the 4 touch sensor groups (TSG #1, TSG #2, TSG #3, TSG #4) included in the touch panel TSP, the touch driving circuit TDC can apply a touch driving signal to all or a part of a plurality of electrodes E included in one touch sensor group in which the single touch has occurred, and receive a touch sensing signal from the electrodes E to which the touch driving signal is applied.

In the step S1920 of performing mutual sensing, when multiple touches occur in an area of one of the 4 touch sensor groups (TSG #1, TSG #2, TSG #3, TSG #4), the touch driving circuit TDC can apply a touch driving signal to one or more of a plurality of electrodes E included in one touch sensor group in which the multiple touches have occurred, and receive a touch sensing signal from electrodes E to which the touch driving signal is not applied.

Figure 20:
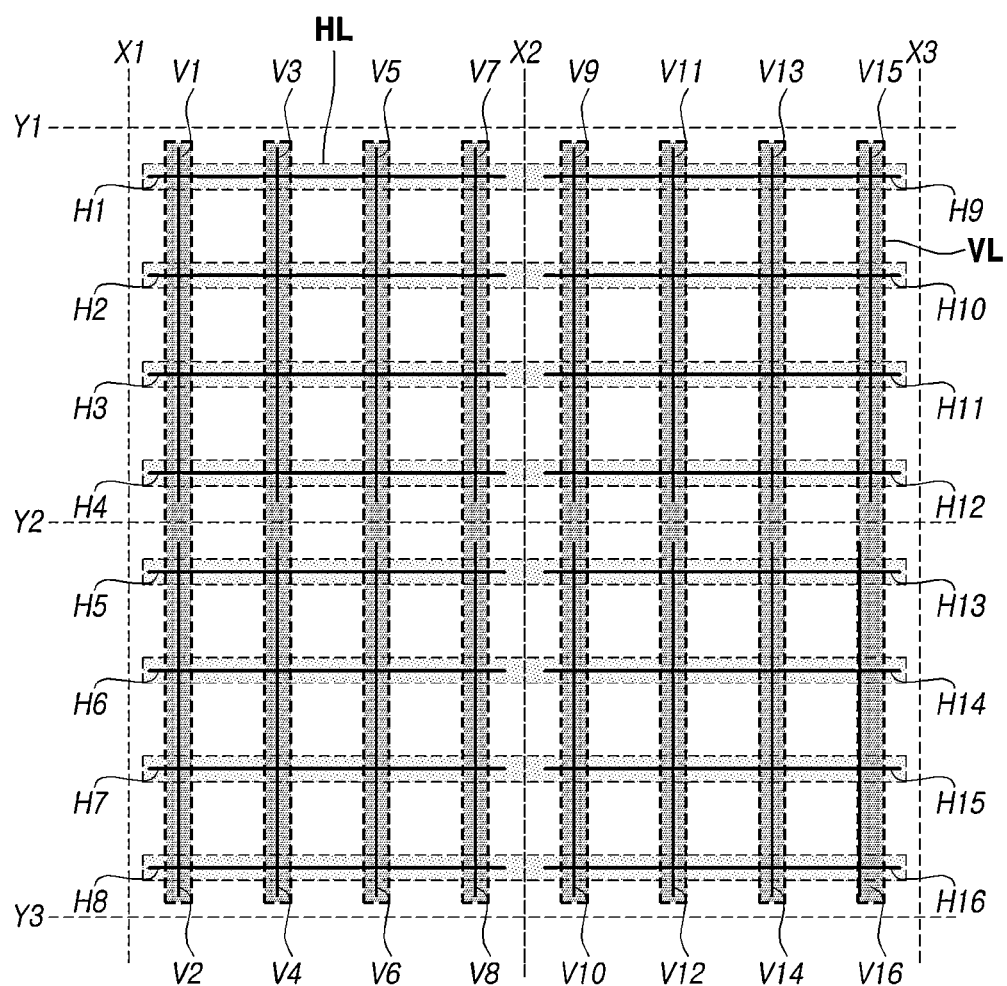
FIG. 20 is a diagram schematically illustrating the hybrid-type touch panel according to embodiments of the present disclosure.

FIG. 20 is a diagram schematically illustrating the hybrid-type touch panel TSP according to embodiments of the present disclosure.

FIG. 20 represents only 32 touch electrodes (V1~V16, H1~H16) shown in FIGS. 13 and 14. Touch electrodes arranged in an identical row are generally represented as one row electrode line HL, and touch electrodes arranged in an identical column are generally represented as one column electrode line VL.

Referring to FIG. 20, the hybrid-type touch panel TSP in accordance with embodiments of the present disclosure can include a plurality of row electrode lines HL arranged in the row direction and a plurality of column electrode lines VL arranged in the column direction.

Each of the plurality of row electrode lines HL may be disconnected at one or more points. For example, a touch electrode H1 and a touch electrode H9 are disconnected.

Each of the plurality of column electrode lines VL may be disconnected at one or more points. For example, a touch electrode V1 and a touch electrode V2 are disconnected.

The number and size of electrodes arranged in each of the plurality of row electrode lines can be different from the number and size of electrodes arranged in each of the plurality of column electrode lines.

Referring to FIG. 20, each of the plurality of row electrode lines HL can be formed by a plurality of electrodes, and each of the plurality of column electrode lines VL can be formed by a plurality of electrodes.

The electrodes included (arranged) in each of the plurality of row electrode lines HL may be electrodes HE arranged in even-numbered electrode rows in each of a plurality of touch sensor groups (TSG #1~ TSG #4).

The electrodes included (arranged) in each of the plurality of column electrode lines VL may be electrodes VE arranged in odd-numbered electrode rows in each of a plurality of touch sensor groups (TSG #1~ TSG #4).

The electrodes included (arranged) in each of the plurality of column electrode lines VL can be separated by the plurality of row electrode lines HL, and electrically connected through a signal line SL overlapping the plurality of row electrode lines HL.

The electrodes included in each of the plurality of row electrode lines HL can be arranged in an identical layer to the electrodes included in each of the plurality of column electrode lines VL.

Generally, according to one aspect of the present technique, a touch display device is presented. The touch display device may include a touch panel TSP including a plurality of touch sensor groups TSG #1, TSG #2, TSG #3, TSG #4, each touch sensor group TSG #1, TSG #2, TSG #3, TSG #4 may include a plurality of electrodes E and a plurality of signal lines SL. The touch display device may further include a touch driving circuit (TDC) for sensing the touch panel. Each of the plurality of touch sensor groups TSG #1, TSG #2, TSG #3, TSG #4 may include a first electrode row ER #1 to a K-th electrode row ER #K. The K being a natural number greater than or equal to 4.

In each of the plurality of touch sensor groups TSG #1, TSG #2, TSG #3, TSG #4:
two or more first electrodes VE may be arranged in each of odd-numbered electrode rows ER #1, ER #3, ER #5, ER #7 of the first to K-th electrode rows ER #1~ER #K, and one second electrode HE may be arranged in each of even-numbered electrode rows ER #2, ER #4, ER #6, ER #8 of the first to K-th electrode rows ER #1~ER #K, wherein each of the second electrode HE may be connected to a signal line SL different from one another, and the first electrodes VE arranged in an identical column row formed by the two or more first electrodes VE arranged in each of the odd-numbered electrode rows ER #1, ER #3, ER #5, ER #7 may be electrically connected to an identical signal line SL; or
two or more first electrodes VE may be arranged in each of even-numbered electrode rows ER #2, ER #4, ER #6, ER #8 of the first to K-th electrode rows ER #1~ER #K, and one second electrode HE may be arranged in each of odd-numbered electrode rows ER #1, ER #3, ER #5, ER #7 of the first to K-th electrode rows ER #1~ER #K, wherein each of the second electrode HE may be connected to a signal line SL different from one another, and the first electrodes VE arranged in an identical column row formed by the two or more first electrodes VE arranged in each of the even-numbered electrode rows may be electrically connected to an identical signal line SL.

Generally, i.e. also for above description of FIGS. 7 to 20, the electrodes of any of the touch sensor groups TSGs may not be electrically connected to the electrodes of any of the adjacent touch sensor groups TSGs or another touch sensor groups TSGs.

Optionally, wherein when at least two touches of multiple touches occur in an area of one of the plurality of touch sensor groups TSG #1, TSG #2, TSG #3, TSG #4, the touch driving circuit TDC may be configured to drive, as a driving electrode, one or more of a plurality of electrodes E included in the one touch sensor group TSG #1 in which the at least two touches of the multiple touches have occurred, and to sense, as a sensing electrode, remaining electrodes E except for the one or more of the plurality of electrodes E included in the one touch sensor group TSG #1.

The plurality of touch sensor groups TSG #1, TSG #2, TSG #3, TSG #4 may include a first touch sensor group TSG #1 and a second touch sensor group TSG #2. The plurality of signal lines SL connecting the plurality of electrodes included in the first touch sensor group TSG #1 to the touch driving circuit TDC may overlap an area of the second touch sensor group TSG #2 and may be insulated from the plurality of electrodes E included in the second touch sensor group TSG #2 in the touch panel TSP.

In an area of each of the plurality of touch sensor groups TSG #1, TSG #2, TSG #3, TSG #4, a size of each of the first electrodes VE may be smaller than a size of the second electrode HE.

In an area of each of the plurality of touch sensor groups TSG #1, TSG #2, TSG #3, TSG #4, the number of first electrodes VE arranged in each electrode row ER #1, ER #3, ER #5, ER #7 or ER #2, ER #4, ER #6, ER #8 may be identical to the number of the electrode rows ER #2, ER #4, ER #6, ER #8 or ER #1, ER #3, ER #5, ER #7 in which the second electrodes HE are arranged.

In an area of each of the plurality of touch sensor groups TSG #1, TSG #2, TSG #3, TSG #4, all the first electrodes VE arranged in an identical column row in odd-numbered electrode rows ER #1, ER #3, ER #5, ER #7 of the first electrode row ER #1 to the K-th electrode rows ER #K, preferably an eighth electrode row K-th electrode rows ER #8, may be connected to one signal line SL and may operate as one touch sensor electrode V1 V16.

In an area of each of the plurality of touch sensor groups TSG #1, TSG #2, TSG #3, TSG #4, a length of the second electrode HE in a row direction may be greater than a length of the second electrode HE in a column direction thereof.

The signal line SL connected to the second electrode HE may be arranged in the column row direction, and the signal lines SL connecting between the first electrodes VE arranged in an identical column row may be arranged in the column direction.

In the touch display device, optionally, when the K is odd, in an area of each of the plurality of touch sensor groups TSG #1, TSG #2, TSG #3, TSG #4, the two or more first electrodes VE arranged in each of the first electrode row ER #1 and the K-th electrode row ER #K may have a smaller size than the two or more first electrodes VE arranged in each of remaining odd-numbered electrode rows ER #1, ER #3, ER #5, ER #7.

In an area of each of the plurality of touch sensor groups TSG #1, TSG #2, TSG #3, TSG #4, the first electrodes VE may be configured to be driving electrodes, and the second electrodes HE may be configured to be sensing electrodes.

Alternatively, in an area of each of the plurality of touch sensor groups TSG #1, TSG #2, TSG #3, TSG #4, the second electrodes HE may be configured to be driving electrodes, and the first electrodes may be configured to be sensing electrodes.

The touch driving circuit TDC may be configured to drive, when multiple touches distributedly occur in areas of at least two of the plurality of touch sensor groups TSG #1, TSG #2, TSG #3, TSG #4, the plurality of electrodes E included in the at least two touch sensor groups in which the multiple touches distributedly have occurred. Additionally, the touch driving circuit TDC may be configured to sense sequentially the plurality of electrodes E included in the at least two touch sensor groups one by one, or two or more at a time.

The touch driving circuit TDC may be configured to drive, when a single touch occurs in an area of one of the plurality of touch sensor groups TSG #1, TSG #2, TSG #3, TSG #4, a plurality of electrodes E included in the one touch sensor group. Additionally, the touch driving circuit TDC may be configured to sense sequentially the plurality of electrodes included in the one touch sensor group one by one, or two or more at a time.

In another aspect of the present technique a touch sensing circuit for a touch display device is presented. The touch display device may be according to the aforementioned aspect. The touch sensing circuit may include a controller 1810 for selecting one of a first sensing scheme and a second sensing scheme as a sensing scheme according to locations of touches of multiple touches when the multiple touches occur in the touch panel TSP of the touch display device. The touch sensing circuit may further include a sensor 1820 for sensing the touch panel TSP based on the selected sensing scheme.

The controller 1810 may be configured to select the first sensing scheme as the sensing scheme when the multiple touches distributedly have occurred in areas of two or more of the plurality of touch sensor groups TSG #1, TSG #2, TSG #3, TSG #4 of the touch display device.

The controller 1810 may be configured to select the second sensing scheme as the sensing scheme when all of the multiple touches have occurred in an area of one of the plurality of touch sensor groups TSG #1, TSG #2, TSG #3, TSG #4 of the touch display device.

The first sensing scheme may be a sensing scheme for sensing a self-capacitance in electrodes arranged in two or more touch sensor groups TSG #1, TSG #2, TSG #3, TSG #4.

The second sensing scheme may be a sensing scheme for sensing a mutual-capacitance between electrodes arranged in one touch sensor group TSG #1, TSG #2, TSG #3, TSG #4.

According to yet another aspect of the present technique, a touch sensing method for a touch display device is presented. The touch display device may be according to the aforementioned aspect. The touch sensing method may include—when a single touch occurs in an area of one of a plurality of touch sensor groups TSG #1, TSG #2, TSG #3, TSG #4 included in the touch panel, applying a touch driving signal to all or one or more of the plurality of electrodes E included in the one touch sensor group in which the single touch has occurred, and receiving a touch sensing signal from the all or one or more of the plurality of electrodes E to which the touch driving signal is applied.

The touch sensing method may further include—when multiple touches occur in the area of one of the plurality of touch sensor groups TSG #1, TSG #2, TSG #3, TSG #4, applying a touch driving signal to one or more of the plurality of electrodes E included in the one touch sensor group in which the multiple touches have occurred, and receiving a touch sensing signal from one or more electrodes to which the touch driving signal is not applied.

According to the embodiments described above, it is possible to provide a touch display device, a touch panel TSP, a touch sensing circuit TSC, and a touch sensing method, for enabling the number of signal lines and the number of touch channels to be reduced, and the ghost phenomenon to reduce or be overcome when multiple touches occur.

In accordance with embodiments of the present disclosure, it is possible to provide a new type of touch panel TSP for enabling the number of signal lines and the number of touch channels to be reduced, and the ghost phenomenon to reduce or be overcome when multiple touches occur, and a touch display device, a touch sensing circuit TSC, and a touch sensing method, for sensing a touch using the new type of touch panel.

In accordance with embodiments of the present disclosure, it is possible to provide a new type of touch panel TSP including a plurality of touch sensor groups, and a touch display device, a touch sensing circuit TSC, and a touch sensing method, for sensing a touch using the new type of touch panel.

In accordance with embodiments of the present disclosure, it is possible to provide a touch display device, a touch panel TSP, a touch sensing circuit TSC, and a touch sensing method, for adaptively implementing one of a self-capacitance touch sensing scheme and a mutual-capacitance touch sensing scheme according to the type (a single touch, multiple touches) and position(s) of a touch event.

It will be apparent to those skilled in the art that various modifications and variations can be made in the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device comprising:
    a touch panel including a plurality of touch sensor groups and a plurality of signal lines, the plurality of touch sensor groups including a plurality of vertical electrodes and a plurality of horizontal electrodes; and
    a touch driving circuit configured to drive the plurality of vertical electrodes and the plurality of horizontal electrodes,
    wherein the plurality of vertical electrodes includes a first vertical electrode and a second vertical electrode, and the plurality of horizontal electrodes includes a first horizontal electrode and a second horizontal electrode,
    wherein the plurality of signal lines includes a first signal line, a second signal line, and a third signal line, the first signal line being electrically connected to the first vertical electrode and the second vertical electrode, the second signal line being electrically connected to the first horizontal electrode, the third signal line being electrically connected to the second horizontal electrode, wherein the first signal line overlaps with the first vertical electrode, the second vertical electrode, the first horizontal electrode, and the second horizontal electrode, and the second signal line overlaps with the first horizontal electrode and the second horizontal electrode, and the third signal line overlaps with the second horizontal electrode,
    wherein the first signal line does not overlap with the second and third signal lines within all or at least a portion of an active area of the touch display device, and the second signal line does not overlap with the third signal line within all or at least a portion of the active area of the touch display device,
    wherein a size of the first horizontal electrode is greater than a size of the first vertical electrode, and a size of the second horizontal electrode is greater than a size of the second vertical electrode, and wherein each of the plurality of touch sensor groups comprises a plurality of touch units, each representing a touch coordinate point distinguished from one another, and
    wherein each of the plurality of touch units includes one first electrode, and a portion of a second electrode with a size corresponding to the one first electrode.

2. The touch display device according to claim 1, wherein the second signal line is electrically connected to the first horizontal electrode without being electrically connected to the second horizontal electrode, and the third signal line is electrically connected to the second horizontal electrode without being electrically connected to the first horizontal electrode.

3. The touch display device according to claim 1, wherein the first signal line is electrically connected to the first vertical electrode through at least one first contact hole, and the first signal line is electrically connected to the second vertical electrode through at least one second contact hole.

4. The touch display device according to claim 1, wherein the touch panel further comprises a plurality of data lines and a plurality of gate lines, and at least one of the plurality of gate lines overlaps with the first signal line, the second signal line, and the third signal line.

5. The touch display device according to claim 1, wherein a distance between the first vertical electrode and the touch driving circuit is greater than a distance between the first horizontal electrode and the touch driving circuit.

6. The touch display device according to claim 1, wherein the first vertical electrode and the second vertical electrode are respectively disposed in first and second electrode rows of electrode rows included in each of the plurality of touch sensor groups, and the first horizontal electrode and the second horizontal electrode are respectively disposed in third and fourth electrode rows, which are different from the electrode rows in which the first vertical electrode and the second vertical electrode are disposed, of electrode rows included in each of the plurality of touch sensor groups.

7. The touch display device according to claim 6, wherein each of the first vertical electrode, the second vertical electrode, the first horizontal electrode, and the second horizontal electrode has a width in a row direction greater than a height in a column direction.

8. The touch display device according to claim 7, wherein the width of the first horizontal electrode or the width of the second horizontal electrode is greater than a sum of respective widths of the first vertical electrode and the second vertical electrode.

9. The touch display device according to claim 8, wherein the plurality of vertical electrodes further includes a third vertical electrode being electrically connected to the first signal line, disposed in a fifth electrode row different from the first to fourth electrode rows, and having a size different from the first vertical electrode and the second vertical electrode.

10. The touch display device according to claim 9, wherein the third vertical electrode has a substantially equal width to the first vertical electrode and the second vertical electrode, and has a height different from the first vertical electrode and the second vertical electrode.

11. The touch display device according to claim 9, wherein the third vertical electrode has a different width and a different height from the first horizontal electrode and the second horizontal electrode.

12. The touch display device according to claim 9, wherein the plurality of vertical electrodes further includes a fourth vertical electrode disposed in an identical electrode row to the first vertical electrode, and a fifth vertical electrode disposed in an identical electrode row to the second vertical electrode, the fourth and fifth vertical electrodes being electrically connected to a fourth signal line, and
    wherein the first to fourth signal lines are arranged in the order of the first signal line, the second signal line, the fourth signal line, and the third signal line from left of each of the plurality of touch sensor groups.

13. The touch display device according to claim 1, wherein the plurality of vertical electrodes further includes a fourth vertical electrode disposed in an identical electrode row to the first vertical electrode, and a fifth vertical electrode disposed in an identical electrode row to the second vertical electrode, the fourth and fifth vertical electrodes being electrically connected to a fourth signal line, and wherein the first to fourth signal lines are arranged in the order of the first signal line, the second signal line, the third signal line, and the fourth signal line from left of each of the plurality of touch sensor groups.

14. The touch display device according to claim 1, wherein the plurality of vertical electrodes further includes a fourth vertical electrode disposed in an identical electrode row to the first vertical electrode, and a fifth vertical electrode disposed in an identical electrode row to the second vertical electrode, the fourth and fifth vertical electrodes being electrically connected to a fourth signal line, and wherein the first to fourth signal lines are arranged in the order of the second signal line, the third signal line, the first signal line, and the fourth signal line from left of each of the plurality of touch sensor groups.

15. The touch display device according to claim 1, wherein, in an area of each of the plurality of touch sensor groups, the number of vertical electrodes or the number of horizontal electrodes arranged in electrode row is identical.

16. The touch display device according to claim 1, wherein in an area of each of the plurality of touch sensor groups, the first and second vertical electrodes are configured to be driving electrodes, and the first and second horizontal electrodes are configured to be sensing electrodes, or wherein in an area of each of the plurality of touch sensor groups, the first and second horizontal electrodes are configured to be driving electrodes, and the first and second vertical electrodes are configured to be sensing electrodes.

17. The touch display device according to claim 1, wherein the touch driving circuit is configured to:

drive, when multiple touches occur in areas of at least two touch sensor groups of the plurality of touch sensor groups, the plurality of electrodes included in the at least two touch sensor groups in which the multiple touches have occurred; and sense, sequentially, the plurality of electrodes included in the at least two touch sensor groups.

18. The touch display device according to claim 17, wherein the touch driving circuit is configured to sense, sequentially, the plurality of electrodes included in the at least two touch sensor groups one by one-by-one, or two or more at a time.

19. The touch display device according to claim 1, wherein the touch driving circuit is configured to:

drive, when a single touch occurs in an area of one of the plurality of touch sensor groups, the plurality of electrodes included in the one touch sensor group; and sense sequentially the plurality of electrodes included in the one touch sensor group.

20. A touch display device comprising:

a touch panel including a plurality of touch sensor groups and a plurality of signal lines, the plurality of touch sensor groups including a plurality of vertical electrodes and a plurality of horizontal electrodes; and a touch driving circuit configured to drive the plurality of vertical electrodes and the plurality of horizontal electrodes, wherein the plurality of vertical electrodes includes a first vertical electrode and a second vertical electrode, and the plurality of horizontal electrodes includes a first horizontal electrode and a second horizontal electrode, wherein the plurality of signal lines includes a first signal line, a second signal line, and a third signal line, the first signal line being electrically connected to the first vertical electrode and the second vertical electrode, the second signal line being electrically connected to the first horizontal electrode, the third signal line being electrically connected to the second horizontal electrode, wherein the first signal line overlaps with the first vertical electrode, the second vertical electrode, the first horizontal electrode, and the second horizontal electrode, and the second signal line overlaps with the first horizontal electrode and the second horizontal electrode, and the third signal line overlaps with the second horizontal electrode, wherein the first signal line does not overlap with the second and third signal lines within all or at least a portion of an active area of the touch display device, and the second signal line does not overlap with the third signal line within all or at least a portion of the active area of the touch display device, wherein a size of the first horizontal electrode is greater than a size of the first vertical electrode, and a size of the second horizontal electrode is greater than a size of the second vertical electrode, and wherein, when at least two touches of multiple touches occur in an area of one touch sensor group of the plurality of touch sensor groups, the touch driving circuit is configured to:

drive, as a driving electrode, one or more of a plurality of electrodes included in the one touch sensor group in which the at least two touches of the multiple touches have occurred; and sense, as a sensing electrode, remaining electrodes, except for the one or more of the plurality of electrodes included in the one touch sensor group.

* * * * *